(12) United States Patent
Li et al.

(10) Patent No.: US 12,058,694 B2
(45) Date of Patent: Aug. 6, 2024

(54) UPLINK LOGICAL CHANNEL SPECIFIC MODULATION AND CODING SCHEME SIGNALING

(71) Applicant: QUALCOMM Incorporated, San Diego, CA (US)

(72) Inventors: Chih-Ping Li, San Diego, CA (US); Mohamed Atef Abdelazim Shehata, Cesson-Sévigné (FR); Mickael Mondet, Louannec (FR); Prashanth Haridas Hande, San Diego, CA (US); Ravi Agarwal, San Diego, CA (US); Peerapol Tinnakornsrisuphap, San Diego, CA (US); Yih-Hao Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 17/654,975

(22) Filed: Mar. 15, 2022

(65) Prior Publication Data

US 2023/0300844 A1    Sep. 21, 2023

(51) Int. Cl.
| | |
|---|---|
| *H04W 72/23* | (2023.01) |
| *H04L 1/00* | (2006.01) |
| *H04L 1/20* | (2006.01) |
| *H04W 72/1268* | (2023.01) |
| *H04W 72/20* | (2023.01) |

(52) U.S. Cl.
CPC ........... *H04W 72/23* (2023.01); *H04L 1/0003* (2013.01); *H04L 1/203* (2013.01); *H04W 72/1268* (2013.01); *H04W 72/20* (2023.01)

(58) Field of Classification Search
CPC . H04W 72/23; H04W 72/1268; H04W 72/20; H04L 1/0003; H04L 1/203; H04L 1/0009; H04L 1/0017; H04L 1/1822; H04L 1/1864
See application file for complete search history.

(56) References Cited

U.S. PATENT DOCUMENTS

| | | | |
|---|---|---|---|
| 2011/0176500 A1 | 7/2011 | Wager et al. | |
| 2012/0276896 A1* | 11/2012 | Ren | H04L 1/0018 455/423 |
| 2017/0094683 A1* | 3/2017 | Sun | H04L 5/00 |
| 2019/0199468 A1* | 6/2019 | Zhao | H04L 1/0003 |
| 2021/0212108 A1* | 7/2021 | Lou | H04W 80/02 |
| 2023/0292359 A1* | 9/2023 | Tesanovic | H04W 72/542 |

\* cited by examiner

*Primary Examiner* — Tejis Daya
(74) *Attorney, Agent, or Firm* — Patterson & Sheridan, LLP

(57) ABSTRACT

Certain aspects of the present disclosure provide techniques wireless communication by a user equipment (UE), comprising receiving an uplink (UL) grant from a network entity, wherein the UL grant schedules the UE to transmit an UL channel transmission associated with a plurality of logical channels (LCs), and the UL grant indicates a modulation and coding scheme (MCS) for transmitting the UL channel transmission associated with the plurality of LCs, receiving a plurality of MCS offsets, and transmitting the UL channel transmission associated with one or more LCs of the plurality of LCs based on the MCS indicated in the UL grant and the plurality of MCS offsets.

30 Claims, 14 Drawing Sheets

UPLINK LOGICAL CHANNEL SPECIFIC MODULATION AND CODING SCHEME SIGNALING

BACKGROUND

Field of the Disclosure

Aspects of the present disclosure relate to wireless communications, and more particularly, to techniques for transmitting logical channels (LCs) based on a modulation and coding scheme (MCS) indicated in an uplink (UL) grant.

Description of Related Art

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available wireless communication system resources with those users Although wireless communication systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communication systems, increasing the ability for different types of devices to intercommunicate, increasing the number and type of wireless communication mediums available for use, and the like. Consequently, there exists a need for further improvements in wireless communications systems to overcome the aforementioned technical challenges and others.

SUMMARY

One aspect provides a method for wireless communication by a user equipment (UE), comprising receiving an uplink (UL) grant from a network entity, wherein the UL grant schedules the UE to transmit an UL channel transmission associated with a plurality of logical channels (LCs), and the UL grant indicates a modulation and coding scheme (MCS) for transmitting the UL channel transmission associated with the plurality of LCs. The method may further include receiving a plurality of MCS offsets. The method may further include transmitting the UL channel transmission associated with one or more LCs of the plurality of LCs based on the MCS indicated in the UL grant and the plurality of MCS offsets.

One aspect provides a method for wireless communication by a user equipment (UE), comprising receiving a plurality of uplink (UL) grants from a network entity, wherein each UL grant schedules the UE to transmit one or more UL channel transmissions associated with a plurality of logical channels (LCs), and each UL grant includes an MCS for transmitting the one or more UL channel transmissions associated with the plurality of LCs. The method may further include transmitting the one or more UL channel transmissions associated with the plurality of LCs based on the MCS included in each UL grant.

One aspect provides a method for wireless communication by a network entity, comprising transmitting an uplink (UL) grant to a user equipment (UE), wherein the UL grant schedules the UE to transmit an UL channel transmission associated with a plurality of logical channels (LCs), and the UL grant indicates a modulation and coding scheme (MCS) for transmitting the UL channel transmission associated with the plurality of LCs. The method may further include transmitting a plurality of MCS offsets to the UE. The method may further include receiving the UL channel transmission associated with one or more LCs of the plurality of LCs based on the MCS indicated in the UL grant and the plurality of MCS offsets.

One aspect provides a method for wireless communication by a network entity, comprising transmitting a plurality of uplink (UL) grants to a user equipment (UE), wherein each UL grant schedules the UE to transmit one or more UL channel transmissions associated with a plurality of logical channels (LCs), and each UL grant includes an MCS for transmitting the one or more UL channel transmissions associated with the plurality of LCs. The method may further include receiving the one or more UL channel transmissions associated with the plurality of LCs based on the MCS included in each UL grant.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
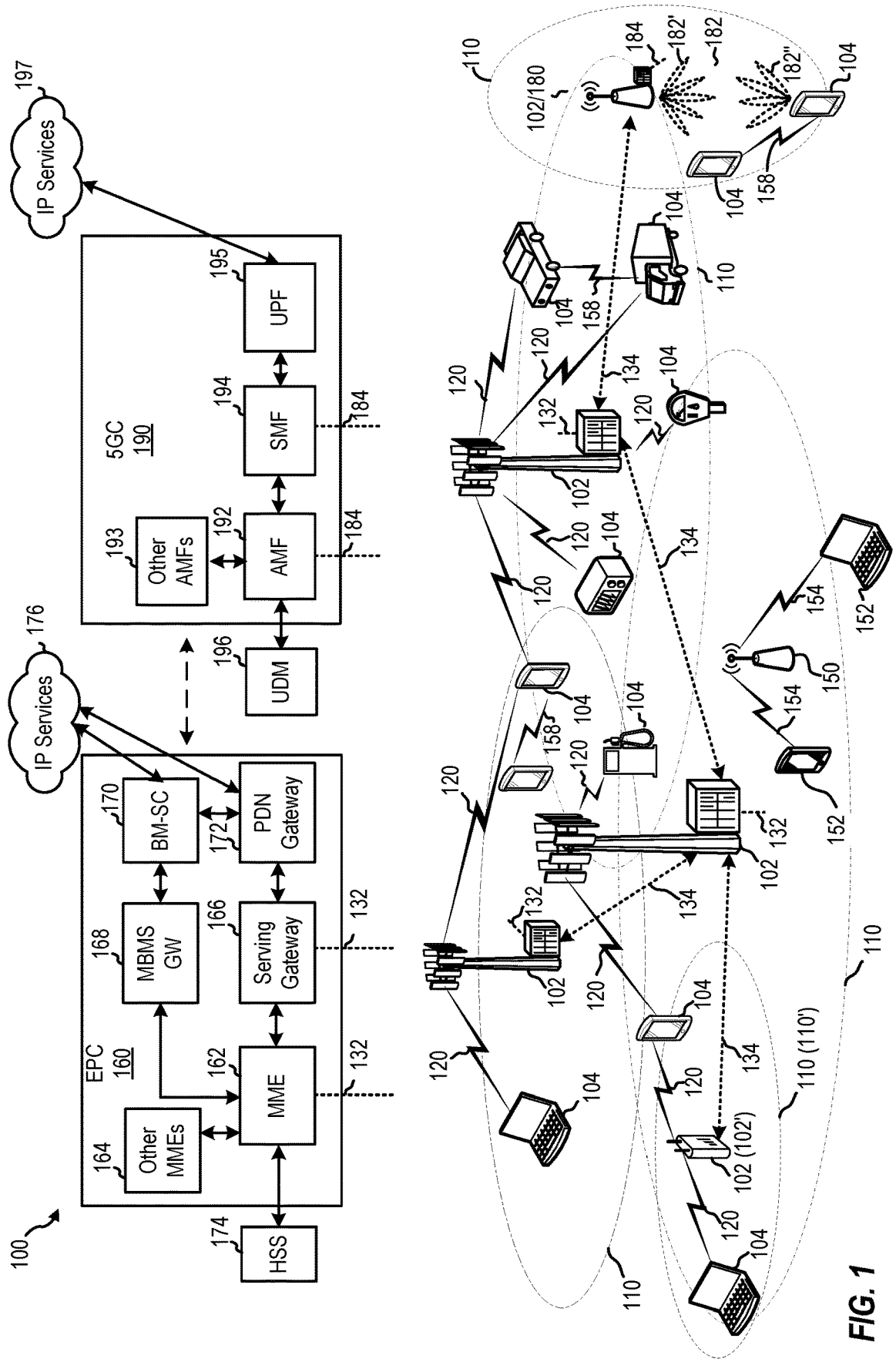
FIG. 1 depicts an example wireless communication network.

Aspects of the present disclosure provide apparatuses, methods, processing systems, and computer-readable mediums for transmitting logical channels (LCs) based on a modulation and coding scheme (MCS) indicated in an uplink (UL) grant.

In a wireless communication network 100 (e.g., 5G NR), communications services may utilize modulation and coding schemes (MCSs) to define resource usage across a transmitted signal. Specifically, an MCS may indicate a modulation and code rate to determine bits within a symbol that can be used for data transmission.

An MCS value may increase or decrease based wireless signal quality. If signal quality is good, an MCS may be high. A transmitter may use more bits per symbol in a subframe to transmit data. Conversely, when signal quality is poor, an MCS may be low. A transmitter may use fewer bits per symbol in a subframe to transmit data. A wireless entity (e.g., a base station (BS)) may select an MCS based on a target block error rate (BLER) defined for a certain transmission. A BLER is the ratio of erroneous blocks to total blocks within one or more transmissions and represents a probability that a block fails to be decoded at a receiver side.

To achieve a target BLER (e.g., 10%) in a given transmission, a gNB may assign an MCS that allows a transmission to meet the BLER under the associated radio link conditions. However, certain transmissions within the wireless network may cause unaccounted for. As a result, the MCS signaled by the gNB may not accurately reflect the transmitted MCS on account of affected radio link conditions. In such a case, an MCS targeting a BLER set at 10% may result in much higher actual BLER, because the MCS was not selected accounting for all network interference. Consequently, a transmission meeting certain quality standards may be unachievable on account of high error rate (i.e., BLER), causing delays or failures requiring retransmission by a network entity that ultimately waste network resources.

According to certain aspects, a conservative MCS estimate may help to achieve a satisfactory BLER for a transmission, reducing the risk of transmission failure. In one case, a BS may allocate a lower MCS in order to meet a BLER target. The allocated MCS may be determined based on a remaining packet delay budget (PDB) (i.e., time allotted for receipt of transmission). The allocated MCS may also be determined based on certain reliability requirements for any given logical channel (LC).

Aspects of the present disclosure describe an LC-specific MCS allocation on for certain transmissions. An MCS offset may be configured by a network entity (e.g., a base station) for an LC via radio, indicating a reduction in MCS to help achieve a desired BLER necessary to meeting a PDB and/or certain reliability requirements. According to certain aspects, a user equipment (UE) may send one or more transmission via LCs based on one or more MCSs indicated in corresponding grants and set of MCS offsets received from a BS. The MCS offsets allow a UE to adjust to meet a PDB and/or certain reliability requirements. By selecting an MCS that may act as a conservative estimate for MCS specific to each LC UL transmission, a UE may adjust transmission to meet PDBs and/or certain reliability requirements, reducing the need for PUSCH retransmissions, thus, saving time, frequency and power resources.

Introduction to Wireless Communication Networks

The techniques and methods described herein may be used for various wireless communications networks. While aspects may be described herein using terminology commonly associated with 3G, 4G, and/or 5G wireless technologies, aspects of the present disclosure may likewise be applicable to other communication systems and standards not explicitly mentioned herein.

FIG. 1 depicts an example of a wireless communication network 100, in which aspects described herein may be implemented.

Generally, wireless communication network 100 includes various network entities (alternatively, network elements or network nodes), which are logical entities associated with, for example, a communication device and/or a communication function associated with a communication device. For example, various functions of a network as well as various devices associated with and interacting with a network may be considered network entities.

In the depicted example, wireless communication network 100 includes base stations (BSs) 102, user equipments (UEs) 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with UEs 104 via communications links 120. The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

FIG. 1 depicts various example BSs 102, which may more generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and others. Each of BSs 102 may provide communication coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communication coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
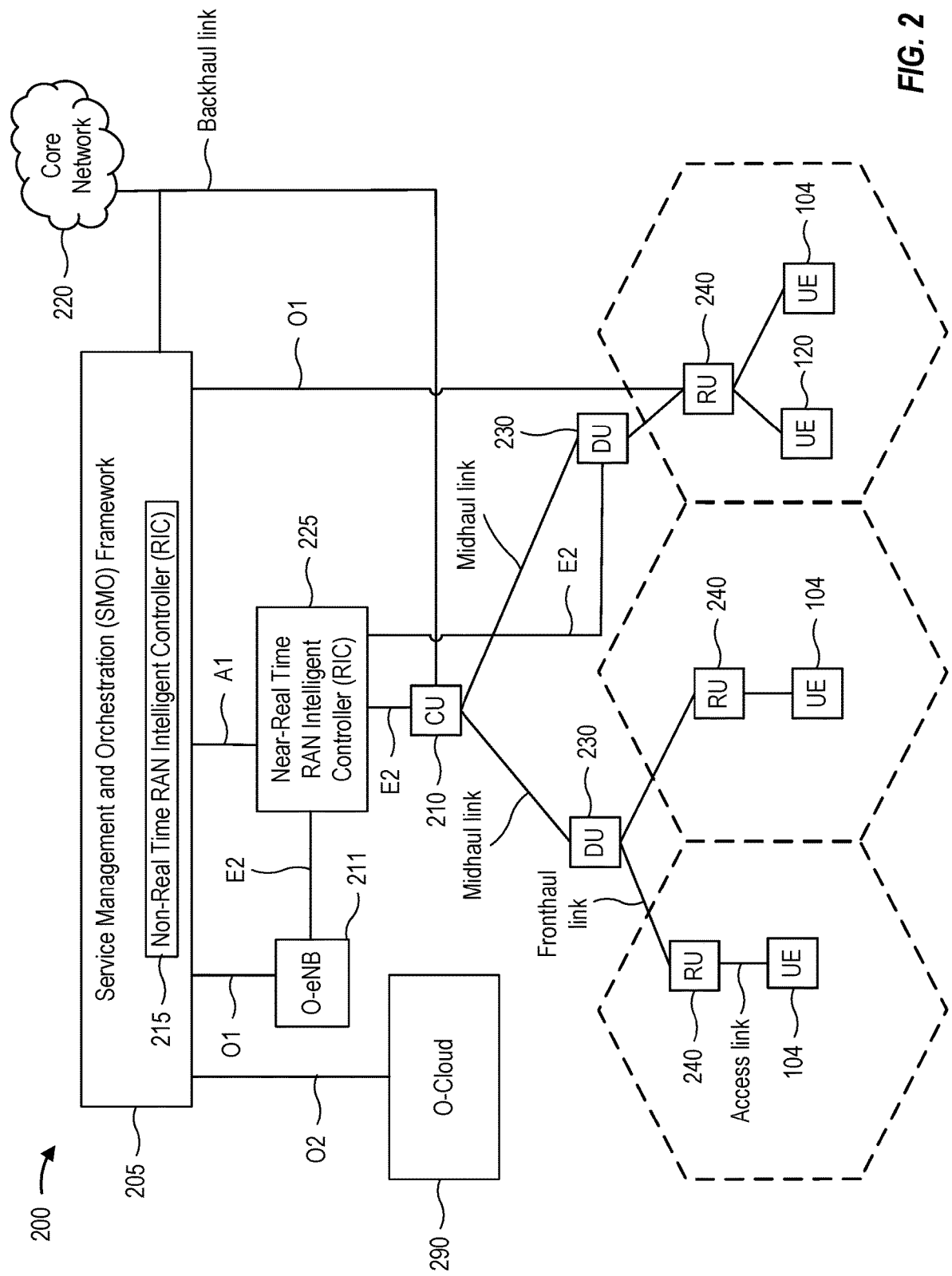
FIG. 2 depicts an example disaggregated base station architecture.

While BSs 102 are depicted in various aspects as unitary communication devices, BSs 102 may be implemented in various configurations. For example, one or more components of base station may be disaggregated, including a central unit (CU), one or more distributed units (DUs), one or more radio units (RUs), a radio unit (RU), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communication network 100 may also be configured to support different radio access technologies, such as 3G, 4G, and 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communication network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communication links 120 between BSs 102 and, for example, UEs 104, may be through one or more carriers, which may have different bandwidths (e.g., 5, 10, 15, 20, 100, 400, and other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182''. UE 104 may also transmit a beamformed signal to the BS 180 in one or more transmit directions 182''. BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communication network 100 further includes a Wi-Fi AP 150 in communication with Wi-Fi stations (STAs) 152 via communication links 154 in, for example, a 2.4 GHz and/or 5 GHz unlicensed frequency spectrum.

Certain UEs 104 may communicate with each other using device-to-device (D2D) communication link 158. D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172 in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT MC 225.

In some implementations, to generate AI/ML models to be deployed in the Near-RT MC 225, the Non-RT RIC 215 may receive parameters or external enrichment information from external servers. Such information may be utilized by the Near-RT MC 225 and may be received at the SMO Framework 205 or the Non-RT MC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
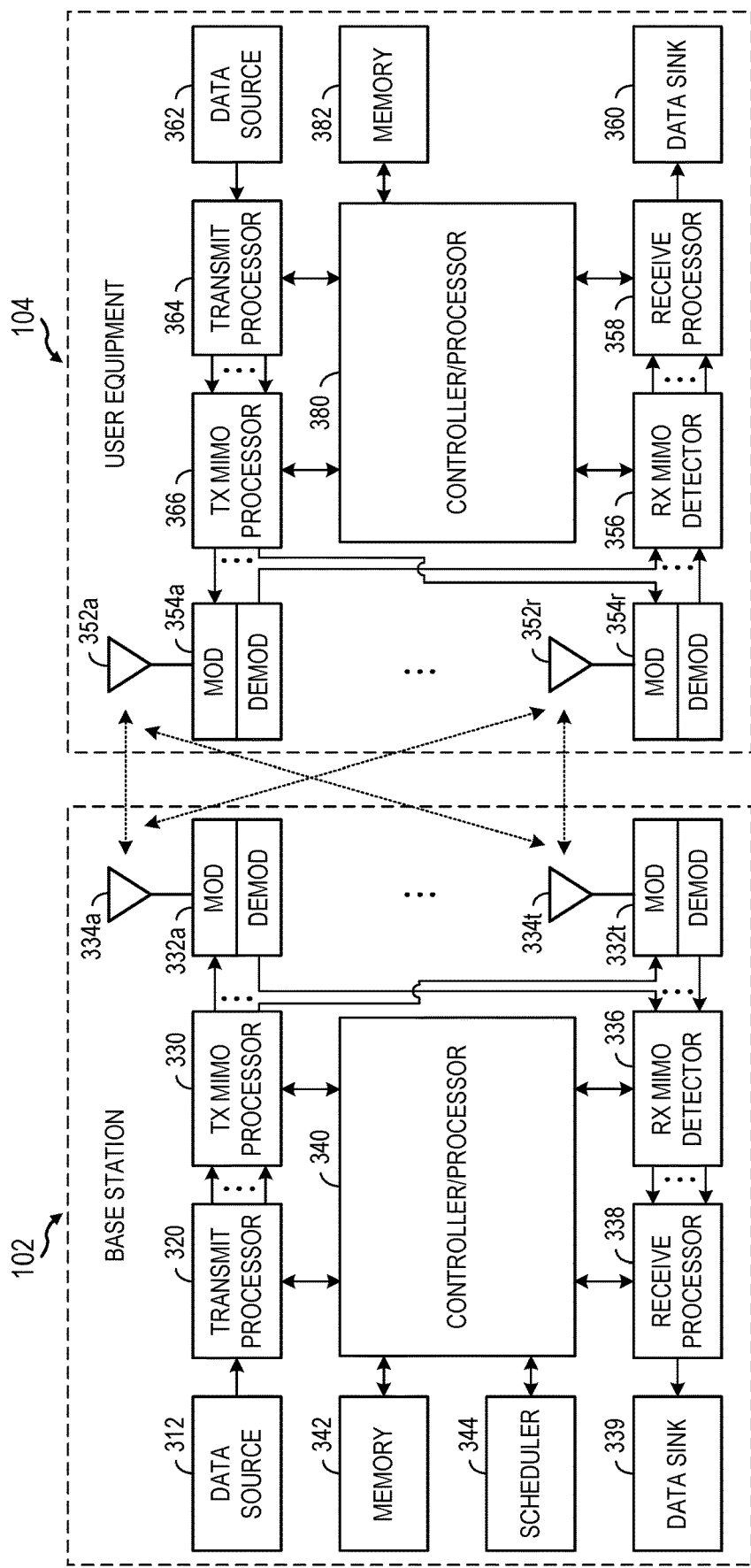
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., data source 362) and wireless reception of data (e.g., data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communication network, such as wireless communication network 100 of FIG. 1.

Figure 4:
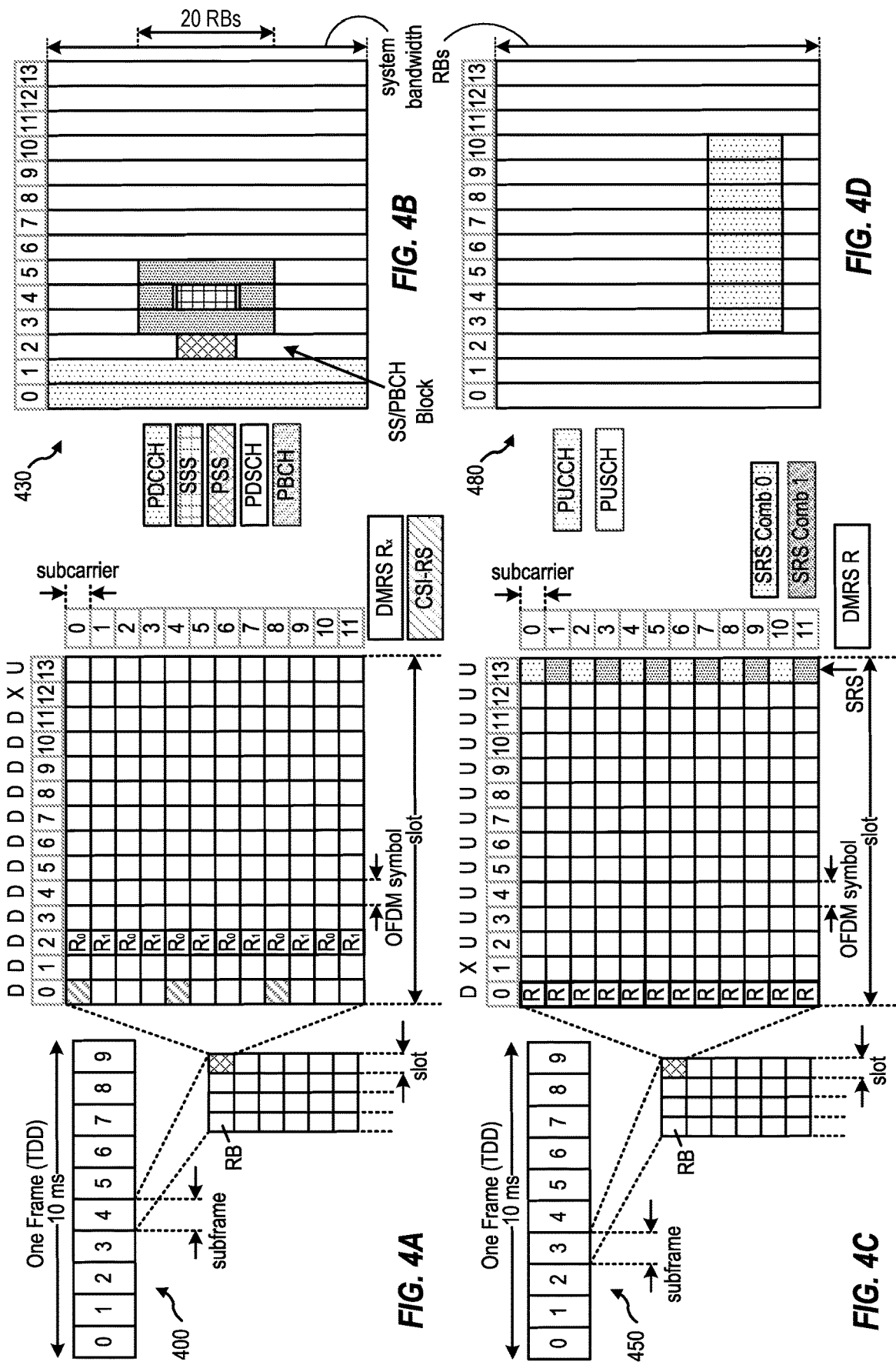
FIGS. 4A, 4B, 4C, and 4D depict various example aspects of data structures for a wireless communication network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communication systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and in the time domain with SC-FDM.

A wireless communication frame structure may be frequency division duplex (FDD), in which for a particular set of subcarriers and subframes within the set of subcarriers are dedicated for either DL or UL. Wireless communication frame structures may also be time division duplex (TDD), in which for a particular set of subcarriers and subframes within the set of subcarriers are dedicated for both DL and UL.

In FIGS. 4A and 4C, the wireless communication frame structure is TDD where D is DL, U is UL, and X is flexible for use between DL/UL. UEs may be configured with the slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot configuration. Subframes may also include mini-slots, which generally have fewer symbols than an entire slot. Other wireless communication technologies may have a different frame structure and/or different channels.

Generally, the number of slots within a subframe is based on a slot configuration and a numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and channel state information reference signals (CSI-RS) for channel estimation at the UE. The RS may also include beam measurement RS (BRS), beam refinement RS (BRRS), and phase tracking RS (PT-RS).

FIG. 4B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may also transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to Modulation and Coding Schemes

In a wireless communication network, such as the wireless communication network 100 of FIG. 1 (e.g., 5G NR), communications services may utilize modulation and coding schemes (MCSs) to define symbol usage across a subframe (e.g., subframes depicted in FIGS. 4A and 4C). An MCS may indicate a modulation and code rate to determine bits within a symbol that can be used for data transmission. Modulation defines the number of bits carried in a single symbol. 5G new radio (NR) supports 16 Quadrature Amplitude Modulation (QAM), 64 QAM, and 256 QAM, and Quadrature Phase Shift Keying (QPSK). Code rate is the ratio of bits used to transmit data with respect to the total number of bits in a symbol.

The modulation and code rate of an MCS may depend on the wireless signal quality, with MCS decreasing or increasing (e.g., from 0 to 31) proportionally with an increase or decrease in wireless signal quality. In other words, an MCS may be selected based on a target block error rate (BLER) defined for a certain transmission, dependent at least in part on radio link conditions. If signal quality is good, MCS may be high (e.g., 10), allowing a transmitter to transmit more bits of data per symbol in a subframe as opposed to lower MCS values. Conversely, when signal quality is poor, MCS may be low (e.g., 3), forcing the transmitter to transmit fewer bits of data per symbol in the subframe.

In some cases, transmissions from a transmitter (e.g., UE 104) may be subject to a particular BLER target (e.g., 10%) to ensure that these transmissions are properly received by a received (e.g., BS 102). In some cases, to maintain this target BLER for a given transmission, a BS may assign an MCS for the transmission that allows the transmission to meet the BLER target under the associated radio link conditions. The BS may signal the allocated MCS to the UE using downlink control information (DCI) for uplink (UL) data transmissions over a physical downlink control channel (PDCCH) (e.g. DCI 0_0, DCI 0_1). The BS may also signal the allocated MCS to the UE in UL grant.

Introduction to Logical Channel Prioritization

Figure 5:
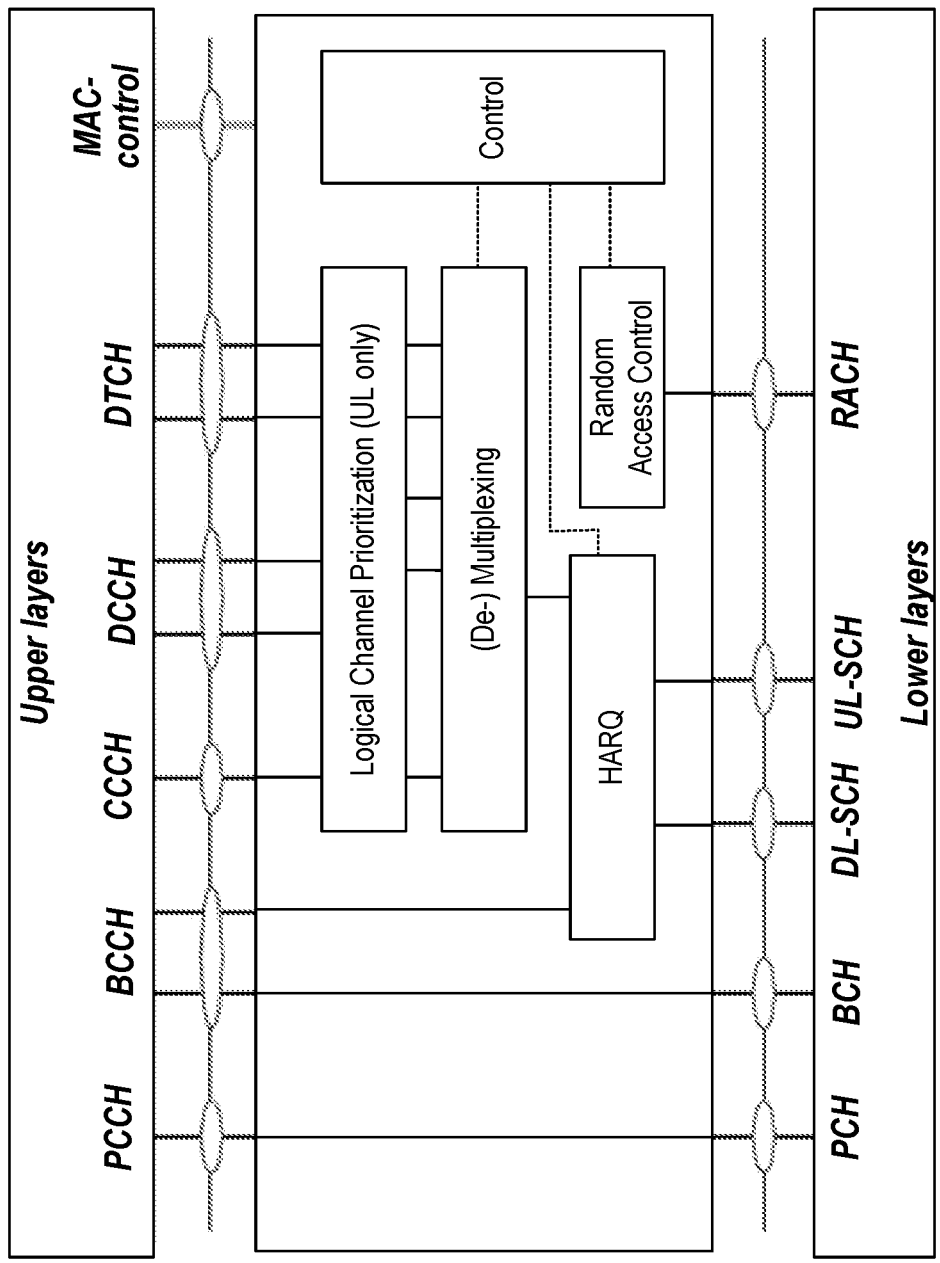
FIG. 5 depicts example medium access control (MAC) layer structure for processing logical channels (LCHs).

In 5G new radio (NR), multiple logical channels (LCs) may be multiplexed into a same transport block using medium access control (MAC) multiplexing functionality of a UE as depicted in FIG. 5. For example, a MAC layer of the UE may be situated between an upper layer (e.g., a Radio Resource Control (RRC) layer and a lower layer (e.g., a physical (PHY) layer). In some cases, the MAC layer may be associated with one or more LCs used for transmitting different types of data. For example, the one or more LCs may include a paging control channel (PCCH), a broadcast control channel (BCCH), a common control channel (CCCH), a dedicated control channel (DCCH), dedicated traffic channel (DTCH), and the like. In some cases, the one or more LCs may be mapped to one or more different physical channels via which the data associated with the one or more LCs is transmitted.

In some cases, a LC prioritization procedure may be performed when transmitting uplink (UL) data via the one or more LCs. For example, the CCCH, the DCCH, and the DTCH channels may undergo this LC prioritization procedure before being multiplexed into a single transport block. The LC prioritization rule is descried in more detail, below. After multiplexing, the single transport block may undergo a subsequent hybrid automatic repeat request (HARQ) procedure, then may be sent to MAC-control.

In many cases, because there may be insufficient UL resources to transmit data for all of the LCs, the LC prioritization procedure may be performed to determine resource allocation for data associated with each LC prior to multiplexing. To prioritize LCs, each LC may be assigned a priority value (e.g., via RRC configuration), which may range from 1 to 16. For downlink (DL) traffic, a scheduler of the BS 102 may determine prioritization. For uplink traffic, the UE 104 may determines prioritization according to a set of well-defined rules and a set of parameters configured by the network in a UL grant. These well-defined rules help to ensure the network and UE are in-sync and that the network (e.g., gNB) knows how to process (de-multiplex) traffic for the different LCs from the uplink transmission (e.g., a physical uplink shared channel—PUSCH).

Aspects Related to UL Logical Channel-Specific MCS Signaling

In some cases, a UL grant (e.g., that indicates a particular MCS) may allocate resources to multiple LCs at of UE according to an LC priority rule. In some cases, the MCS indicated within the UL grant may target a same BLER (e.g., 10%) for all LCs. As a result, all LCs may need a same number of hybrid automatic repeat request (HARQ) transmissions and round-trip time (RTT) to yield the target BLER.

In some cases, certain types of traffic (e.g., extended reality (XR) UL traffic, and the like), may be associated with multiple "flows" or logical channels, each of which may be associated with different periodicities, throughput, packet delay budgets (PDBs), etc. A PDB defines the upper bound for the total time a packet may be delayed between a UE and a user plane function (UPF) before the packet transmission is terminated. A packet delay longer than a PDB results in transmission failure that may require retransmission of a packet and the violation of quality of service (QoS) requirements.

In some cases, these flows may be classified into different types of flows, such as large flows and small flows. Large flows may comprise, for example, high-throughput video data transmitted in a streaming scenario. Small flows may comprise, for example, control information transmitted between a UE and a BS. In some cases, a large flow may be characterized as a flow having a high periodicity (e.g., 100 ms), a high throughput (e.g., >2 Mbps), and a high PDB (e.g., 100 ms). In some cases, due to the relatively high PDB, large flows may be associated with a BLER of 10%, which may improve resource efficiency and system capacity while employing a typical MCS (e.g., an MCS associated with 10% BLER under a given radio condition).

In some cases, a small flow in UL traffic may be characterized as a flow with a low periodicity (e.g., 20 ms), low throughput (e.g., 0.1 Mbps), and low PDB (e.g., 15 ms). In some cases, due to the relatively low PDB, small flows may be associated with a BLER target of 1% requiring a conservative MCS for UL transmission. In some cases, a BLER target of 1% may reduce a number of HARQ transmissions and overall latency to meet the relatively low PDB, without hurting total spectral efficiency.

In addition, small flows cause and are affected by bursty inter-cell interference more so than large flows. As a result of this bursty interference, MCS prediction signaled by the BS for small flows may be less accurate and targeting a 10% BLER for small flows may result in much higher actual BLER. Thus, a conservative MCS estimate for small flows may help to achieve a satisfactory BLER for UL transmission.

However, in some cases, only one MCS may be indicated in an UL grant and applied to UL transmission for all flows. Where a single MCS is signaled for all flows, the MCS estimation may be blind to bursty interference and poor radio link conditions that may affect each individual flow. As a result, any adjustments made to a BLER target by a UE for each flow may only be based on the blind MCS estimation, and actual BLER for certain flows may far exceed the BLER target. Additionally, a UE may not be able to adjust transmission to meet PDBs based on the blind MCS estimation. As a result, the UE may not be able to meet QoS requirements of user applications, causing UL transmission failure since high BLER and undue packet delay may cause certain packets to exceed a defined PDB.

Accordingly, aspects of the present disclosure provide techniques for helping to resolve the issues described above related to exceeding BLER targets and PDBs when transmitting UL channel transmissions associated with one or more LCs/flows. In some cases, the techniques may involve multiple MCS offsets that may be applied to different LCs. In some cases, the techniques may include receiving multiple UL grants with multiple MCSs. In some cases, a BS can estimate a remaining PDB of a flow, a lower MCS may be allocated to meet the BLER target prior to the PDB of the flow expiring. The techniques may allow a UE to satisfy transmission requirements (e.g., PDB, target BLER) given certain radio link conditions. For example, by using MCS offsets for different LCs and/or receiving multiple UL grants with multiple MCSs, the techniques presented herein may permit UE may be able to adjust MCSs used to transmit UL channel transmissions associated with the one or more LCs to meet PDBs, reducing the need for retransmissions and, thereby, saving time, frequency, and power resources.

Example Operations for Transmitting an Uplink Transmission Using MCS Offsets

Figure 6:
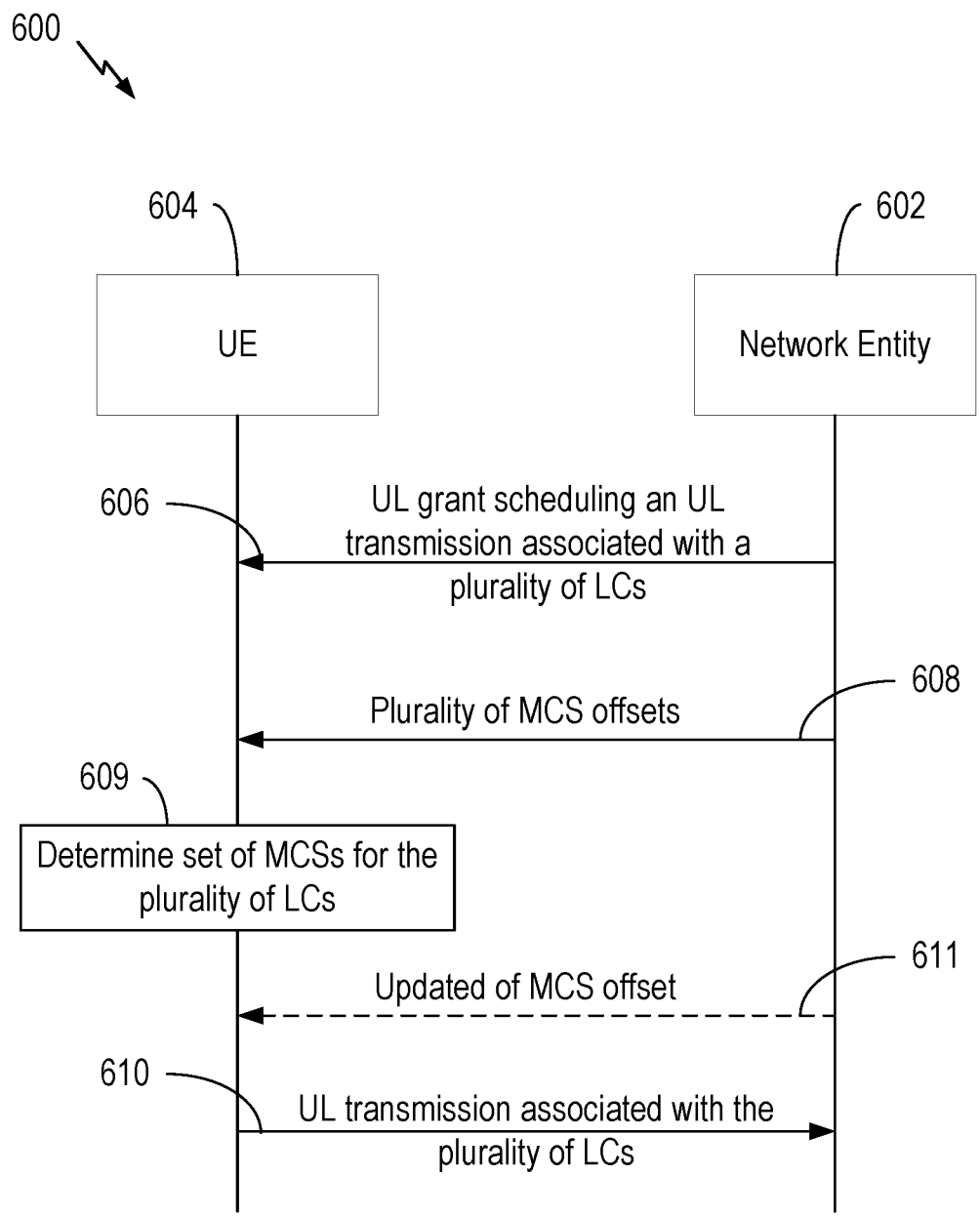
FIG. 6 depicts a process flow for communication in a network between a UE and a BS.

FIG. 6 depicts a process flow of operations 600 for communication in a network between a network entity 602 and a user equipment (UE) 604. In some aspects, the network entity 602 may be an example of the BS 102 depicted and described with respect to FIGS. 1 and 3 or a disaggregated BS as described with respect to FIG. 2. Similarly, the UE 604 may be an example of UE 104 depicted and described with respect to FIGS. 1 and 3. However, in other aspects, UE 104 may be another type of wireless communication device and BS 102 may be another type of network entity or network node, such as those described herein.

In step 606, the UE 604 receives an uplink (UL) grant from the network entity 602. In some cases the UL grant schedules the UE to transmit an UL channel transmission associated with a plurality of LCs. Additionally, in some cases, the UL grant indicates an MCS for transmitting the UL channel transmission associated with the plurality of LCs.

In step 608, the UE 604 receives a plurality of MCS offsets from the network entity 602.

Thereafter, in step 610, the UE 604 transmits an UL transmission via LCs based on the indicated MCS and the plurality of MCS offsets at 610.

In some cases, the plurality of MCS offsets may correspond to different types of LCs, such as small flows/LCs and large flows/LCs. For example, in some cases, the plurality of MCS offsets may include a first MCS offset for a first type of LC (e.g., a negative offset, such as −2) and a second MCS offset for a second type of LC (e.g., 0). In some cases, the different types of LCs may include a first type of LC and a second type of LC. In some cases, the first type of LC may be associated with at least one of a first BLER target level, a first PDB, a first throughput, or a first periodicity. In some cases, the first type of LC may be associated with different types of traffic, such as enhanced mobile broadband (eMBB) traffic, extended reality video traffic, or the like. In some cases, eMBB traffic may not have an associated PDB.

In some cases, the second type of LC may be associated with at least one of a second BLER target level, a second PDB, a second throughput, or a second periodicity. In some cases, the first BLER target level associated with the first type of LC is higher than the second BLER target level associated with the second type of LC. Similarly, in some cases, the first PDB, the first throughput, and the first periodicity may each respectively be higher than the second PDB, the second throughput, and the second periodicity.

As noted above, the UL grant received at 606 by the UE 604 may include an MCS for transmitting the UL channel transmission. In some cases, the UE 604 may use the MCS indicated in the UL grant and the plurality of MCS offsets to determine MCSs for the plurality of LCs. For example, as shown at 609 in FIG. 6, the UE determines a set of MCSs, the set of MCSs including a different MCS for each different type of LC of the different types of LCs.

In some cases, the UE 604 may determine the set of MCSs, for each different type of LC, by applying a corresponding MCS offset for that different type of LC to the MCS indicated in the UL grant. For example, assuming that the MCS indicated in the UL grant is 10 and that the plurality of LCs include the first type of LC and the second type of LC discussed above. In such cases, the UE may determine a first MCS for the first type of LC by applying the negative offset for the first type of LC (e.g., −2) to the MCS indicated in the UL grant (e.g., 10), resulting in an MCS of 8 for the first MCS for the first type of LC. Similarly, the UE may determine a second MCS for the second type of LC by applying the offset for the second type of LC (e.g., 0) to the MCS indicated in the UL grant (e.g., 10), resulting in an MCS of 10 for the second MCS for the second type of LC.

Figure 7A:
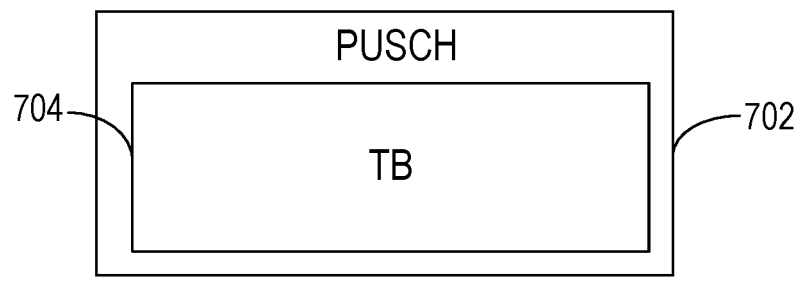
FIGS. 7A and 7B depict physical uplink transmissions having one or more transmit blocks (TBs).

In some cases, transmitting the UL channel transmission associated with the one or more LCs in step 610 of FIG. 6 may include transmitting one transport block (TB) in the UL channel transmission. For example, as shown in FIG. 7A, in response to receiving the scheduling information in step 606 of FIG. 6, the UE 504 may transmit a UL PUSCH transmission 702. As can be seen, the PUSCH transmission 702 includes one TB 704, which may include data associated with the plurality of LCs.

In some cases, when only one TB is transmitted within an UL transmission and because the one TB includes data from one or more different LCs of the plurality of LCs each of which may be associated with a different MCS, the UE 604 may be configured to select one MCS from the set of determined MCSs, as described above, and use the one MCS to transmit the one TB (including the data associated the one or more different LCs of the plurality of LCs) in the UL transmission. In some cases, the UE 604 may select the MCS to use for transmitting the UL transmission in different manners.

For example, in some cases, the MCS of the highest priority LC that has nonempty UE buffer may be used for data of all LCs within a TB transmitted in a PUSCH. In other words, in some cases, transmitting the UL channel transmission associated with the one or more LCs in step 610 of FIG. 6 may include transmitting the one TB using an MCS from the set of MCSs corresponding to an LC having UL traffic for transmission with a highest priority. For example, assume that the plurality of LCs include the first type of LC (e.g., associated with the MCS of 8) and the second type of LC (e.g., associated with the MCS of 10). Under this example, when both the first type of LC and second type of LC have data within the UE buffer for transmission, the MCS of 8 associated with the first type of LC may be used to transmit the one TB in the UL transmission. In cases, when the first type of LC does not have data in the UE buffer for transmission but the second type of LC does have data in the UE buffer for transmission, then the MCS of 10 may be used to transmit the one TB in the UL transmission.

In some cases, a lowest MCS of all LCs that have nonempty buffer may be used for data of all LCs within the one TB transmitted in PUSCH. In other words, transmitting the UL channel transmission associated with the one or more LCs in step 610 in FIG. 6 may include transmitting the one TB using a lowest MCS from the set of MCSs corresponding to an LC having UL traffic for transmission. For example, the MCS of 10 associated with the second type of LC may be used for the one TB if the first type of LC has no data within the UE buffer for transmission.

In some cases, a negatively offset MCS may be used to transmit the one TB in the PUSCH if all LCs with higher MCS have an empty buffer. In other words, the set of MCSs include at least one MCS that is lower than the MCS indicated in the UL grant resulting from application of a negative offset from the plurality of MCS offsets being applied to the MCS indicated in the UL grant, such as the −2 offset associated with the first type of LC applied to the MCS of 10 indicated in the UL grant. In such cases, transmitting the UL channel transmission associated with the one or more LCs in step 610 of FIG. 6 may include transmitting the one TB using the at least one MCS that is lower than the MCS indicated in the UL grant only when a second set of LCs associated with one or more higher MCSs do not have UL traffic for transmission. For example, the MCS of 10 associated with the second type of LC may be used for transmitting the one TB whenever the second type of LC has data in the UE buffer for transmission. When the second type of LC does not have data for transmission in the UE buffer, the negatively offset MCS of 8 may be used for transmitting the one TB.

In some cases, the UE 604 may receive one or more updated MCS offsets from the network entity 602, for example, when remaining PDBs associated with certain LCs of the plurality of LCs are running low. For example, in some cases, the UE 604 may be located near an edge of a cell and, as a result, may not receive as many scheduled transmissions (e.g., due to "pfair" scheduling). As a result, while LCs of the second type of LC may be associated with a large PDB (e.g., 100 ms), a remaining PDB for the LCs of the second type of LC may be small by the time the UE 604 is scheduled (e.g., due to infrequent scheduling while operating near the cell edge). In such cases, in order to ensure transmissions associated with the second type of LCs are properly received prior to expiration of the PDB, the network entity 602 may update the second MCS offset associated with the second type of LCs so that a more conservative MCS is used for the transmissions associated with the second type of LCs, thereby increasing the probability that these transmissions will be correctly received and the remaining PDB satisfied.

Accordingly, as shown in step 611 in FIG. 6, in some cases, the UE 604 may receive an updated MCS offset for a first LC of the plurality of LCs having first UL traffic for transmission. In some cases, the updated MCS offset is based on a (remaining) PDB associated with the first UL traffic for transmission for the first LC. In some cases, the UE 604 may receive the updated MCS in a media access control-control element (MAC CE) or in RRC signaling.

Thereafter, the UE 604 may determine an updated MCS for the first LC by applying the updated MCS offset to the MCS indicated in the UL grant received in step 606. In such cases, transmitting the UL channel transmission associated with the one or more LCs in step 610 may include transmitting the first UL traffic in the one TB via the first LC using the updated MCS.

Figure 7B:
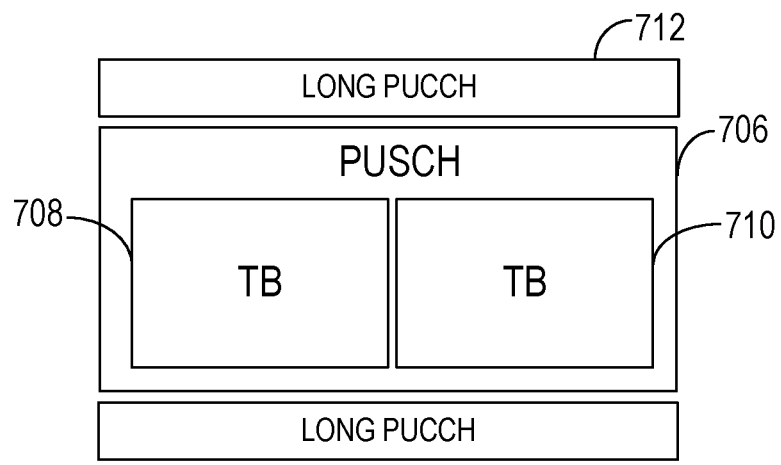

In some cases, as described above, the UE 604 transmits one TB in the UL transmission (e.g., PUSCH) as illustrated in FIG. 7A. In other cases, to improve data transmission coverage of UL transmissions, the UE 604 may transmit a plurality of TBs within the UL transmission (e.g., PUSCH includes two or more TBs). For example, as shown in FIG. 7B, in response to receiving the scheduling information in step 606 of FIG. 6, the UE 604 may transmit a UL PUSCH transmission 706. As can be seen, the PUSCH transmission 706 includes a first TB 708 and a second TB 710.

In some cases, each TB of the plurality of TBs may be associated with a different LC of the plurality of LCs. Further, each TB may be associated with a different coding rate, and a different modulation order (e.g., a different MCS from the set of MCSs corresponding to that different LC), allowing the UE 604 to transmit each TB according to present radio link conditions and allowing each TB to be transmitted within a required PBD. Accordingly, transmitting the UL channel transmission associated with the one or more LCs in step 610 in FIG. 11 may include transmitting each TB associated with the different LC and using the different MCS corresponding to that TB and different LC.

In some cases, the UE 604 may multiplex uplink control information (UCI) with the UL channel transmission transmitted in step 610 in FIG. 6. In other words, transmitting the UL transmission associated with the plurality of logical channels in step 610 may include transmitting UCI with the UL channel transmission associated with the plurality of logical channels. In some cases, for each TB of the plurality of TBs transmitted in the UL channel transmission, the UCI may include at least one of a starting position in frequency for that TB, a starting position in time for that TB, a bandwidth of that TB, or a length of that TB in time. For example, with reference to FIG. 7B, the UCI may indicate the starting positions in time and frequency for the first TB 708 and second TB 710, a bandwidth associated with the first TB 708 and second TB 710, and time lengths of the first TB 708 and second TB 710.

In some cases, the UCI may be transmitted in a long physical uplink control channel (PUCCH) 712 as shown in FIG. 7B, a short PUCCH, or the PUSCH transmission 706 as shown in FIG. 7B. In other words, transmitting the UCI may comprise one of transmitting the UCI in a long physical uplink control channel multiplexed with the UL channel transmission, transmitting the UCI in a short physical uplink control channel multiplexed with the UL channel transmission, or transmitting the UCI in the UL channel transmission.

In some cases, transmitting the UCI may comprise transmitting the UCI using the MCS indicated in the UL grant. For example, the first TB 708 of FIG. 7B may be associated with the first type of LC and first MCS discussed above (e.g., an MCS of 8). However, while the first TB 708 is associated with an MCS of 8, the UCI transmitted by the UE 604 may be transmitted using the MCS indicated in the UL grant (e.g., and MCS of 10).

Additionally, in some cases, transmitting the UCI may comprise transmitting the UCI using the MCS of one or more LCs or TBs. For example, the first TB 708 of FIG. 7B may be associated with the first type of LC and first MCS discussed above (e.g., an MCS of 8). Accordingly, the UCI transmitted by the UE 604 may be transmitted using the first MCS.

In some cases, the UL grant may be received in downlink control information (DCI) from the network entity 602. In some cases, the DCI may include separate LC-specific parameters for each TB of the plurality of TBs to be transmitted in the UL transmission. For example, in some cases, the separate LC-specific parameters include at least different hybrid automatic repeat request (HARQ) process IDs for each TB of the plurality of TBs. In other words, each TB of the plurality of TBs may have a different HARQ process ID. Further, in some cases, the UE 604 may receive one or more updated LC-specific parameters for at least one TB of the plurality of TBs in a MAC-CE or RRC signaling from the network entity 602.

There may be instances in which at least one TB of the plurality of TBs may need to be retransmitted. In such cases, the UE 604 may receive an additional DCI from the network entity 602 including an indication of one of the HARQ process IDs corresponding to one of the TBs of the plurality of TBs. The indication of the one HARQ process ID may indicate to the UE 604 to retransmit the one TB corresponding to the one HARQ process ID included in the additional DCI. The UE 604 may then retransmit the one TB corresponding to the one HARQ process ID included in the additional DCI.

For example, in some cases, the first TB 708 in FIG. 7B may carry a "new" transmission associated with the first type of LC with a HARQ ID "1" and an MCS of 8. The second TB 710 in FIG. 7B may carry a "new" transmission associated with the second type of UE with a HARQ ID "2" and an MCS of 10. After the first TB 708 and second TB 710 are transmitted, the network entity 602 may send a DCI to the UE 604 indicating HARQ ID 1. In this case, the UE 604 may transmit the UL transmission including a retransmission of the first TB 708. Further, in this case, the MCS of 8 may be directly signaled in an UL retransmission grant or an MCS of 10 may be signaled in an UL grant and the UE 604 may apply the −2 MCS offset to the indicated MCS of 10.

Example Operations for Transmitting Uplink Transmissions Based on MCSs in Multiple Uplink Grants In some cases, a UE may receive a plurality of UL grants in a plurality of DCIs, each including an MCS, and may transmit one or more UL transmissions based on the MCS included in each UL grant. In other words, a number of MCSs (and a number of associated BLER targets) received by the UE may be equal to the number of DCIs received.

Figure 8:
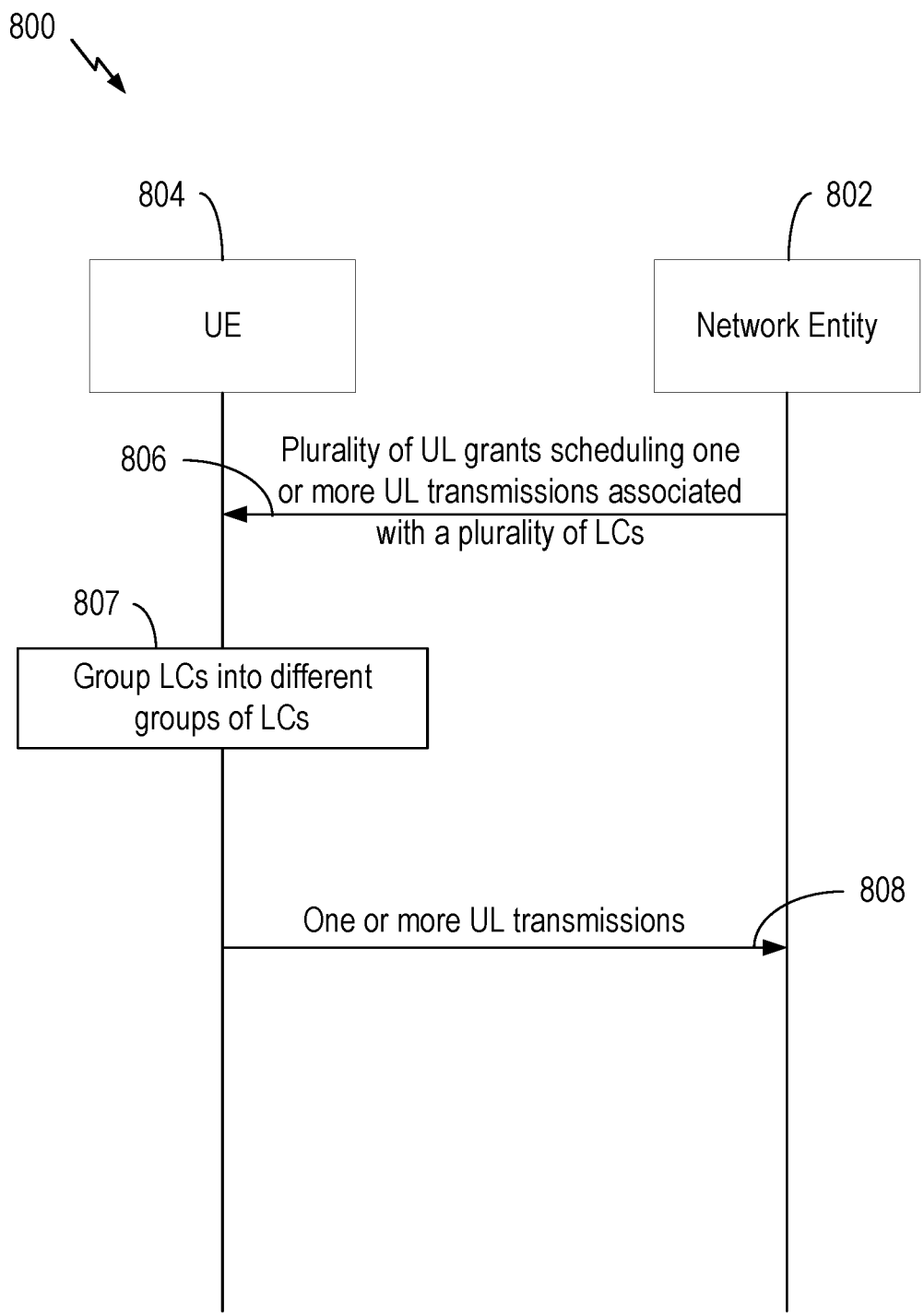
FIG. 8 depicts a process flow for communication in a network between a UE and a BS.

FIG. 8 depicts a process flow 800 for communication in a network between a network entity 802 and a user equipment (UE) 804. In some aspects, the network entity 802 may be an example of the BS 102 depicted and described with respect to FIGS. 1 and 3, the network entity 602 of FIG. 6, or a disaggregated BS as described with respect to FIG. 2. Similarly, the UE 804 may be an example of UE 104 depicted and described with respect to FIGS. 1 and 3 or the UE 604 of FIG. 6. However, in other aspects, UE 104 may be another type of wireless communication device and BS 102 may be another type of network entity or network node, such as those described herein.

In step 806, the UE 804 receives a plurality of UL grants from the network entity 802. In some cases, each UL grant schedules the UE 804 to transmit one or more UL channel transmissions associated with a plurality of LCs. Additionally, each UL grant includes an MCS for transmitting the one or more UL channel transmissions associated with via the plurality of LCs.

Thereafter, in step 808, the UE 804 transmits, to the network entity 802, the one or more UL channel transmissions associated with the plurality of LCs based on the MCS included in each UL grant. For example, the UE 804 may transmit a first UL transmission based on a first MCS indicated in a first DCI, a second UL transmission based on a second MCS indicated in a second DCI, a third UL transmission based on a third MCS indicated in a third DCI, and so on, equal to the number of UL grants/DCIs scheduling UL transmissions received in step 806.

In some cases, the one or more UL channel transmissions associated with the plurality of LCs may be associated with different BLER targets. Accordingly, in order to help ensure that transmission of the one or more UL channel transmissions satisfy their respective BLER targets, the plurality of LCs associated with the one or more UL channel repetitions may be grouped into different groups of LCs, as shown in step 807.

For example, in step 807, the UE 604 may group the plurality of LCs into the different groups of LCs based on a BLER target for each LC in the plurality of LCs. Each group of LCs may be associated with a different BLER target and includes LCs of the plurality of LCs associated with that BLER target. In some cases, two different groups of LC may be sufficient, such as a first group of LCs associated with a first BLER target and a second group of LCs associated with a second BLER target.

In some cases, the UE 604 may obtain an indication of the BLER target for each LC in the plurality of LCs in different manners. For example, in some cases, the indication of the BLER target for each LC may be obtained directly in fifth generation quality of service indicator (5QI) signaling received from the network entity 602. In other cases, the indication of the BLER target for each LC may be obtained based on PDBs for each LC and a 5QI table. For example, in some cases, the UE 604 may deduce the BLER target for an LC based on the PDB associated with the LC and an error rate in the 5QI table.

In some cases, each UL grant of the plurality of UL grants received in step 806 from the network entity 802 may correspond to a different group of LCs, within which a LC priority rule may be followed. In some cases, the UL grants may indicate a group of LCs to which the UL grant corresponds.

For example, in some cases, each UL grant of the plurality of UL grants may include a LC group index indicating the different group of LCs to which that UL grant corresponds. In some cases, each UL grant of the plurality of UL grants may include a BLER index indicating the different group of LCs to which that UL grant corresponds. In such cases, grouping the plurality of LCs into the different groups of LCs in step 807 may be based on the LC group index or the BLER index included in each UL grant. For example, in some cases, a UL grant may include a BLER index mapping to 1% or a LC group index indicating group #1. Based on the BLER index or LC group index, the UE 804 may then group this UL grant to a first group of LCs corresponding to a BLER target of 1% and/or LC group index #1.

In some cases, each UL grant of the plurality of UL grants may include a bitmap of LC identifiers (LCIDs) indicating LCs of the plurality of LCs that correspond with that UL grant. For example, an UL grant may include a bit map "10011," indicating that the UL grant maps to LC groups 1, 4, and 5. Accordingly, grouping the plurality of LCs into the different groups of LCs in step 807 of FIG. 8 may be based on the bitmap of LCIDs included in each UL grant.

In some cases, a search space in which an UL grant is received may indicate the LC group to which this UL grant corresponds. For example, in some cases, each UL grant is received in a particular search space. In some cases, the particular search space may be different for each UL grant. In other cases, multiple UL grants may be received in one search space with other UL grants may be received in another search space. In any case, the search space of each UL grant may indicate the different group of LCs to which that UL grant corresponds. For example, in some cases, a first UL grant may be received in a first search space that maps to a first group of LCs while a second UL grant may be received in second search space that maps to a second group of LCs.

In some cases, the UE 804 may need to perform a number of blind decodes when receiving the plurality of UL grants within one or more search spaces, which may consume a significant amount of power. In some cases, the UE 804 may perform blind decoding of the plurality of UL grants according to one or more rules. The one or more rules may help to reduce complexity, latency, and power consumption associated with the blind decoding. For example, in some cases, to reduce blind decoding complexity, the one or more rules may specify that the plurality of UL grants are to be transmitted by the network entity 802 and received by the UE 804 in a continuous search space. In some cases, reduce blind decoding complexity, the one or more rules may specify that the plurality of UL grants are to be transmitted by the network entity 802 and received by the UE 804 using a same set of frequency resources at different (e.g., back-to-back) times.

In some cases, the MCS of each UL grant of the plurality of UL grants received by the UE 804 in step 806 may comprise a same MCS. However, in this case, each UL grant may include a power boosting level for the different group of LCs corresponding to that UL grant. The indicated power boosting levels may allow the UE 804 to effectively control signal-to-interference-plus-noise ratios (SINRs) of the one or more UL transmissions associated with the different groups of LCs. Controlling the SINRs of the one or more UL transmissions based on the power boosting levels may help to ensure BLER targets and PDBs for these one or more UL transmissions are satisfied without adjusting an MCS for these one or more UL transmissions.

In other cases, different power boosting levels and MCSs may be indicated for each UL grant. For example, in some cases, the MCS of each UL grant of the plurality of UL grants received by the UE 804 in step 806 may comprise a different MCS. Additionally, in some cases, each UL grant includes a power boosting level for the different group of LCs corresponding to that UL grant. In such cases, transmitting the one or more UL channel transmissions associated with the plurality of LCs in step 808 may be based on the different MCSs and power boosting levels for each of the different groups of LCs.

Example Operations of a User Equipment

Figure 9:
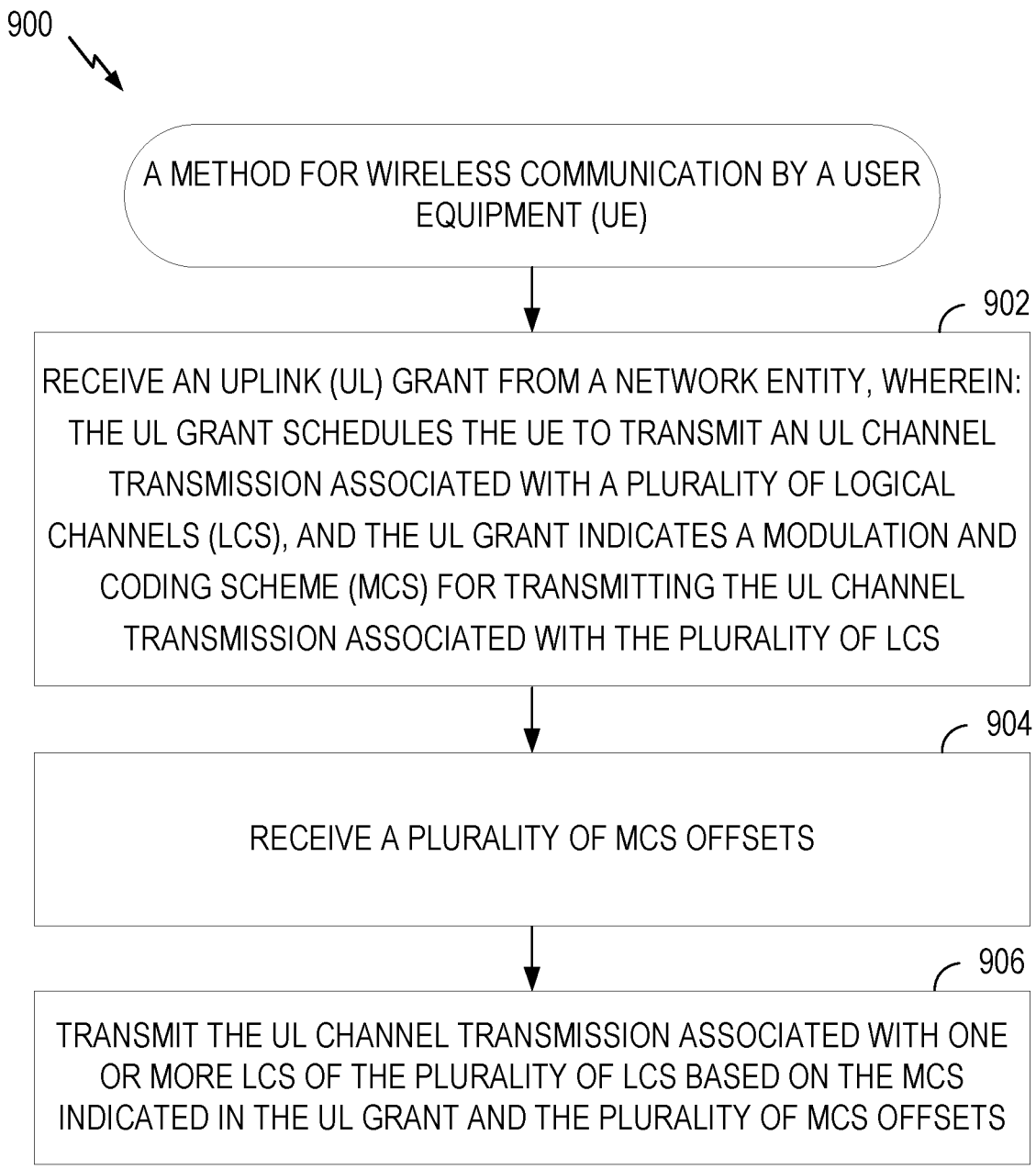
FIG. 9 depicts a method for wireless communication.

FIG. 9 shows a method 900 for wireless communication by a UE, such as UE 104 of FIGS. 1 and 3.

Method 900 begins at 902 with receiving an uplink (UL) grant from a network entity, wherein the UL grant schedules the UE to transmit an UL channel transmission associated with a plurality of logical channels (LCs), and the UL grant indicates a modulation and coding scheme (MCS) for transmitting the UL channel transmission associated with the plurality of LCs.

Method 900 then proceeds to step 904 with receiving a plurality of MCS offsets.

Method 900 then proceeds to step 906 with transmitting the UL channel transmission associated with one or more LCs of the plurality of LCs based on the MCS indicated in the UL grant and the plurality of MCS offsets.

In one aspect, method 900 further includes determining a set of MCSs, the set of MCSs including a different MCS for each different type of LC of the different types of LCs.

In one aspect, method 900 further includes receiving an updated MCS offset for a first LC of the plurality of LCs having first UL traffic for transmission, wherein the updated MCS offset is based on a packet delay budget (PDB) associated with the first UL traffic for transmission for the first LC, and determining an updated MCS for the first LC by applying the updated MCS offset to the MCS indicated in the UL grant, wherein transmitting the UL channel transmission associated with the one or more LCs comprises transmitting the first UL traffic in the one TB using the updated MCS.

In one aspect, method 900 further includes transmitting uplink control information (UCI) with the UL channel transmission associated with the plurality of logical channels.

In one aspect, method 900 further includes receiving one or more updated LC-specific parameters for at least one TB of the plurality of TBs in a media access control-control element (MAC-CE) or radio resource control (RRC) signaling from the BS.

In one aspect, method 900 further includes receiving an additional DCI from the network entity including an indication of one of the HARQ process IDs corresponding to one of the TBs of the plurality of TBs, the indication of the one HARQ process ID indicating to the UE to retransmit the one TB corresponding to the one HARQ process ID.

In one aspect, the plurality of MCS offsets includes MCS offsets corresponding to different types of LCs of the plurality of LCs.

In one aspect, the different types of LCs include at least a first type of LC corresponding to LCs of the plurality of LCs associated with a first block error rate (BLER) target level, and a second type of LC corresponding to LCs of the plurality of LCs associated with a second BLER target level, and the first BLER target level is higher than the second BLER target level.

In one aspect, determining the set of MCSs comprises, for each different type of LC, applying a corresponding MCS offset for that different type of LC to the MCS indicated in the UL grant.

In one aspect, transmitting the UL channel transmission associated with the one or more LCs comprises transmitting one transport block (TB) in the UL channel transmission.

In one aspect, receiving the UL channel transmission associated with the one or more LCs comprises receiving the one TB using an MCS corresponding to an LC with UL traffic in the one TB with a highest priority.

In one aspect, transmitting the UL channel transmission associated with the one or more LCs comprises transmitting the one TB using a lowest MCS from the set of MCSs corresponding to an LC having UL traffic for transmission.

In one aspect, the set of MCSs include at least one MCS that is lower than the MCS indicated in the UL grant resulting from application of a negative offset from the plurality of MCS offsets being applied to the MCS indicated in the UL grant, and transmitting the UL channel transmission associated with the one or more LCs comprises transmitting the one TB using the at least one MCS that is lower than the MCS indicated in the UL grant only when a second set of LCs associated with one or more higher MCSs do not have UL traffic for transmission.

In one aspect, receiving the updated MCS offset comprises receiving the updated MCS offset from the network entity via a media access control-control element (MAC-CE) or radio resource control (RRC) signaling.

In one aspect, transmitting the UL channel transmission associated with the one or more LCs comprises transmitting a plurality of transport block (TBs) in the UL channel transmission.

In one aspect, each TB of the plurality of TBs is associated with a different LC of the plurality of LCs and a different MCS from the set of MCSs corresponding to that different LC, and transmitting the UL channel transmission associated with the one or more LCs comprises transmitting each TB associated with the different LC using the different MCS corresponding to that TB and different LC.

In one aspect, for each TB of the plurality of TBs transmitted in the UL channel transmission, the UCI indicates at least one of a starting position in frequency for that TB, a starting position in time for that TB, a bandwidth of that TB, or a length of that TB in time.

In one aspect, transmitting the UCI comprises one of transmitting the UCI in a long physical uplink control channel multiplexed with the UL channel transmission, transmitting the UCI in a short physical uplink control channel multiplexed with the UL channel transmission, or transmitting the UCI in the UL channel transmission.

In one aspect, transmitting the UCI comprises transmitting the UCI using the MCS indicated in the UL grant.

In one aspect, the UL grant is received in downlink control information (DCI), the DCI including separate LC-specific parameters for each TB of the plurality of TBs.

Figure 13:
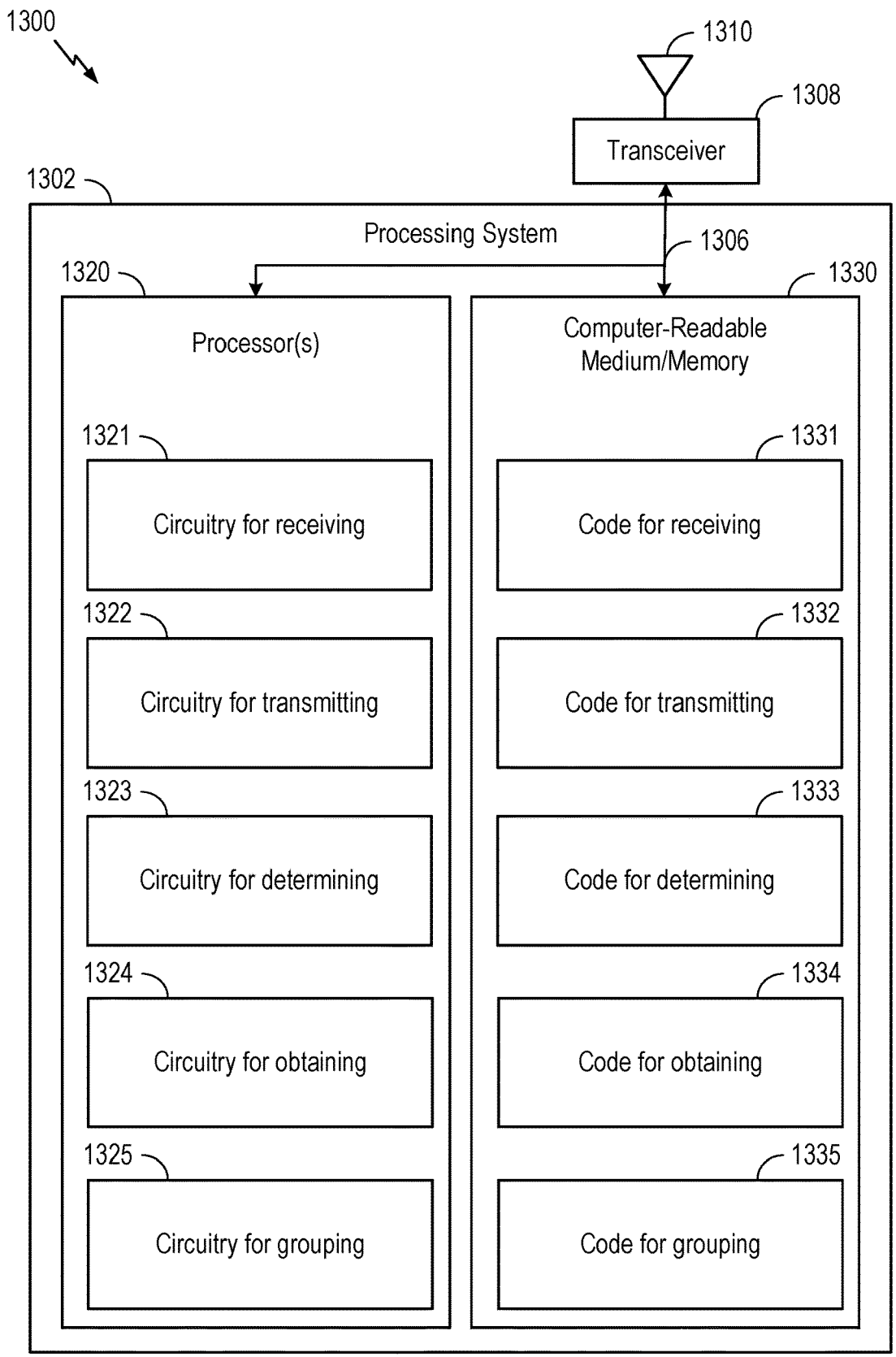
FIG. 13 depicts aspects of an example communications device.

In one aspect, method 900, or any aspect related to it, may be performed by an apparatus, such as communications device 1300 of FIG. 13, which includes various components operable, configured, or adapted to perform the method 900. Communications device 1300 is described below in further detail.

Note that FIG. 9 is just one example of a method, and other methods including fewer, additional, or alternative steps are possible consistent with this disclosure.

Figure 10:
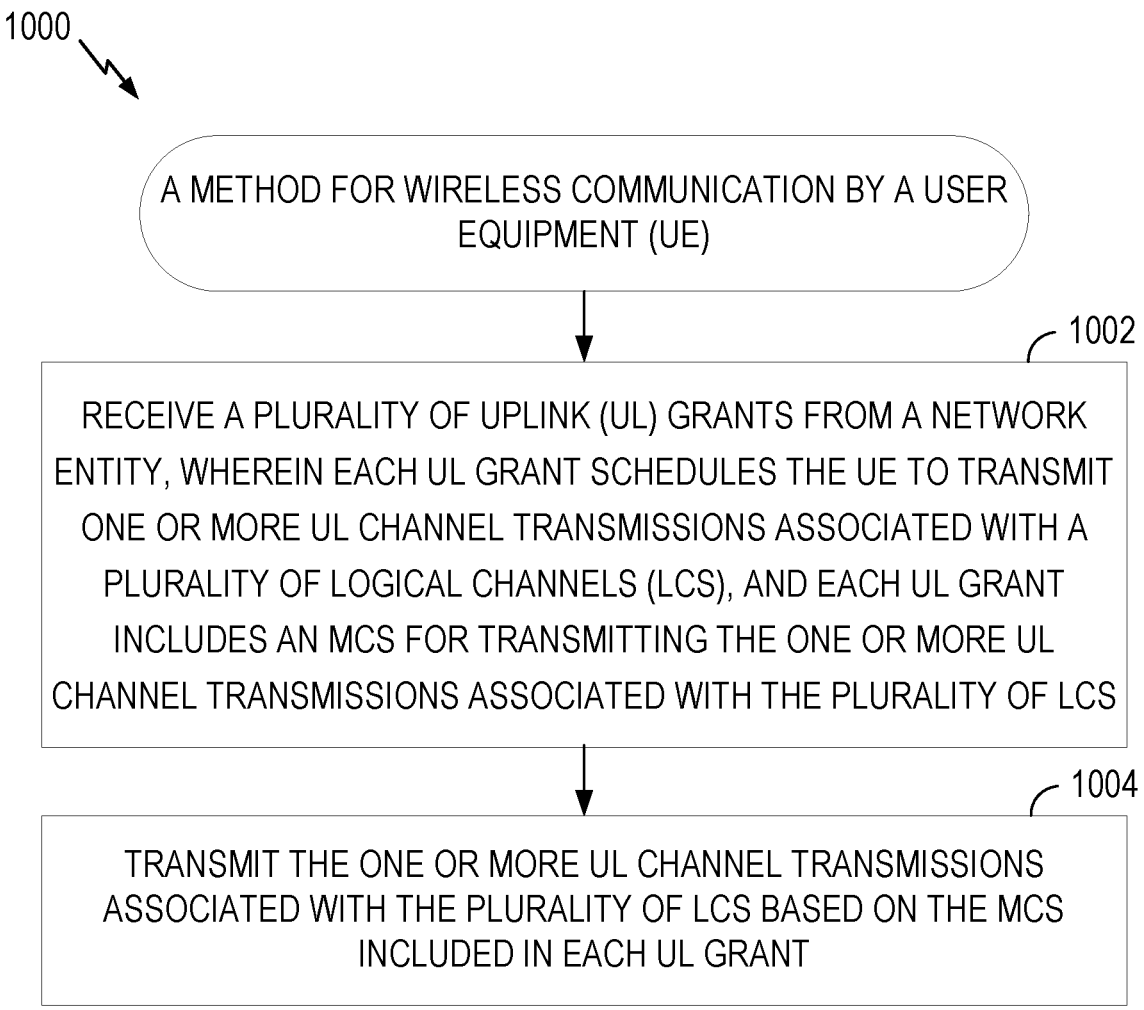
FIG. 10 depicts a method for wireless communication.

FIG. 10 shows a method 1000 for wireless communication by a UE, such as UE 104 of FIGS. 1 and 3.

Method 1000 begins at 1002 with receiving a plurality of uplink (UL) grants from a network entity, wherein: each UL grant schedules the UE to transmit one or more UL channel transmissions associated with a plurality of logical channels (LCs), and each UL grant includes an MCS for transmitting the one or more UL channel transmissions associated with the plurality of LCs.

Method 1000 then proceeds to step 1004 with transmitting the one or more UL channel transmissions associated with the plurality of LCs based on the MCS included in each UL grant.

In one aspect, method 1000 further includes grouping the plurality of LCs into different groups of LCs.

In one aspect, method 1000 further includes obtaining an indication of the BLER target for each LC in the plurality of LCs, wherein the indication of the BLER target for each LC in the plurality of LCs is one of obtained directly in fifth generation quality of service indicator (5QI) signaling received from the BS, or obtained based on packet delay budgets (PDBs) for each LC and a 5QI table.

In one aspect, grouping the plurality of LCs into the different groups of LCs is based on a block error rate (BLER) target for each LC in the plurality of LCs, and each group of LCs is associated with a different BLER target and includes LCs of the plurality of LCs associated with that BLER target.

In one aspect, each UL grant of the plurality of UL grants received from the network entity corresponds to a different group of LCs.

In one aspect, each UL grant of the plurality of UL grants includes at least one of a LC group index indicating the different group of LCs to which that UL grant corresponds, or a BLER index indicating the different group of LCs to which that UL grant corresponds, and grouping the plurality of LCs into the different groups of LCs is based on the LC group index or BLER index included in each UL grant.

In one aspect, each UL grant of the plurality of UL grants includes a bitmap of LC identifiers (LCIDs) indicating LCs of the plurality of LCs that correspond with that UL grant, and grouping the plurality of LCs into the different groups of LCs is based on the bitmap of LCIDs included in each UL grant.

In one aspect, each UL grant is received in a different search space, and the different search space of each UL grant indicates the different group of LCs to which that UL grant corresponds, and grouping the plurality of LCs into the different groups of LCs is based on the different search spaces in which the UL grants are received.

In one aspect, the MCS of each UL grant comprises a same MCS, and each UL grant includes a power boosting level for the different group of LCs corresponding to that UL grant.

In one aspect, the plurality of UL grants are received in a continuous search space.

In one aspect, the plurality of UL grants are received using a same set of frequency resources at different times.

In one aspect, method 1000, or any aspect related to it, may be performed by an apparatus, such as communications device 1300 of FIG. 13, which includes various components operable, configured, or adapted to perform the method 1000. Communications device 1300 is described below in further detail.

Note that FIG. 10 is just one example of a method, and other methods including fewer, additional, or alternative steps are possible consistent with this disclosure.

Example Operations of a Base Station

Figure 11:
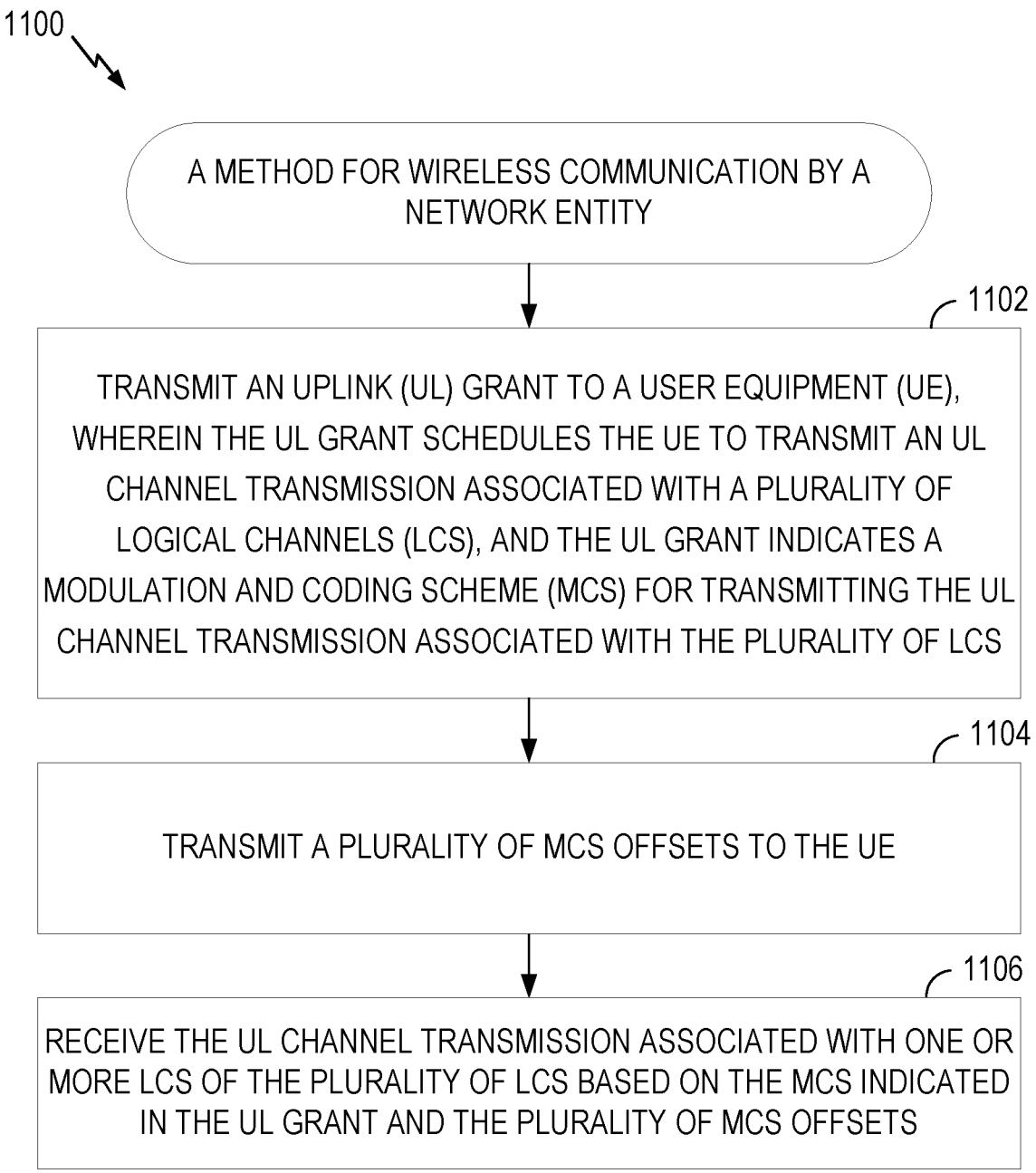
FIG. 11 depicts a method for wireless communication.

FIG. 11 shows a method 1100 for wireless communication by a user equipment, such as BS 102 of FIGS. 1 and 3, or a disaggregated base station as discussed with respect to FIG. 2.

Method 1100 begins at 1102 with transmitting an uplink (UL) grant to a user equipment (UE), wherein: the UL grant schedules the UE to transmit an UL channel transmission associated with a plurality of logical channels (LCs), and the UL grant indicates a modulation and coding scheme (MCS) for transmitting the UL channel transmission associated with the plurality of LCs.

Method 1100 then proceeds to step 1104 with transmitting a plurality of MCS offsets to the UE.

Method 1100 then proceeds to step 1106 with receiving the UL channel transmission associated with one or more LCs of the plurality of LCs based on the MCS indicated in the UL grant and the plurality of MCS offsets.

In one aspect, method 1100 further includes transmitting an updated MCS offset for a first LC of the plurality of LCs having first UL traffic for transmission, wherein the updated MCS offset is based on a packet delay budget (PDB) associated with the first UL traffic for transmission for the first LC, wherein receiving the UL channel transmission associated with the one or more LCs comprises receiving the first UL traffic in the one TB using the updated MCS.

In one aspect, method 1100 further includes receiving uplink control information (UCI) with the UL channel transmission associated with the plurality of logical channels.

In one aspect, method 1100 further includes transmitting one or more updated LC-specific parameters for at least one TB of the plurality of TBs in a media access control-control element (MAC-CE) or radio resource control (RRC) signaling from the network entity.

In one aspect, method 1100 further includes transmitting an additional DCI from the network entity including an indication of one of the HARQ process IDs corresponding to one of the TBs of the plurality of TBs, the indication of the one HARQ process ID indicating to the UE to retransmit the one TB corresponding to the one HARQ process ID.

In one aspect, the plurality of MCS offsets includes MCS offsets corresponding to different types of LCs of the plurality of LCs.

In one aspect, the different types of LCs include at least a first type of LC corresponding to LCs of the plurality of LCs associated with a first block error rate (BLER) target level, and a second type of LC corresponding to LCs of the plurality of LCs associated with a second BLER target level, and the first BLER target level is higher than the second BLER target level.

In one aspect, receiving the UL channel transmission associated with the one or more LCs comprises receiving one transport block (TB) in the UL channel transmission.

In one aspect, receiving the UL channel transmission associated with the one or more LCs comprises receiving the one TB using an MCS corresponding to an LC with UL traffic in the one TB having a highest priority.

In one aspect, receiving the UL channel transmission associated with the one or more LCs comprises receiving the one TB using a lowest MCS corresponding to an LC having UL traffic in the one TB.

In one aspect, receiving the UL channel transmission associated with the one or more LCs comprises receiving the one TB using at least one MCS that is lower than the MCS indicated in the UL grant.

In one aspect, for each TB of the plurality of TBs transmitted in the UL channel transmission, the UCI indicates at least one of: a starting position in frequency for that TB, a starting position in time for that TB, a bandwidth of that TB, or a length of that TB in time.

In one aspect, receiving the UCI comprises one of: receiving the UCI in a long physical uplink control channel multiplexed with the UL channel transmission, receiving the UCI in a short physical uplink control channel multiplexed with the UL channel transmission, or receiving the UCI in the UL channel transmission.

In one aspect, receiving the UCI comprises receiving the UCI using the MCS indicated in the UL grant.

In one aspect, the UL grant is transmitted in downlink control information (DCI), the DCI including separate LC-specific parameters for each TB of the plurality of TBs.

In one aspect, the separate LC-specific parameters include at least different hybrid automatic repeat request (HARM) process IDs for each TB of the plurality of TBs.

Figure 14:
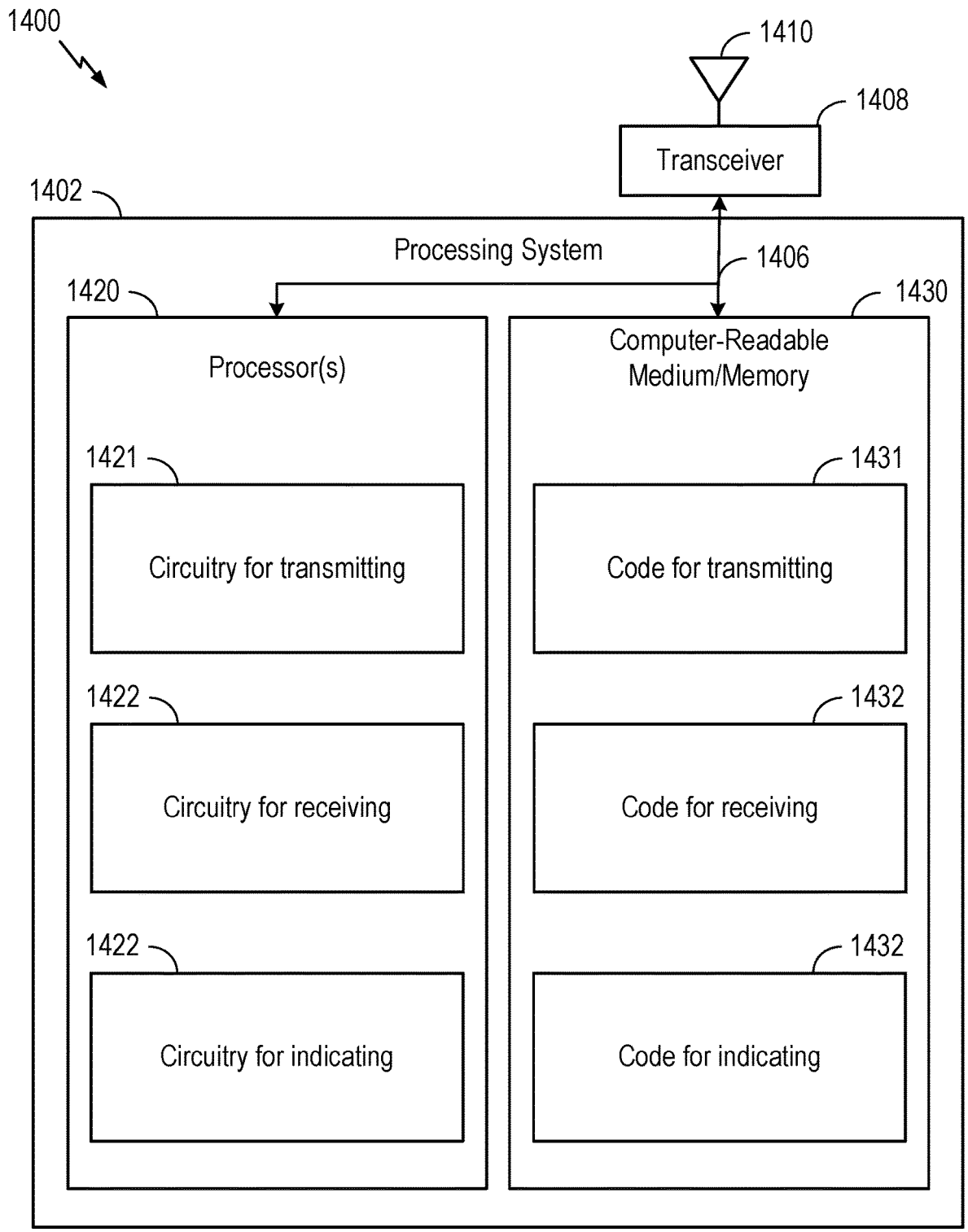
FIG. 14 depicts aspects of an example communications device.

In one aspect, method 1100, or any aspect related to it, may be performed by an apparatus, such as communications device 1400 of FIG. 14, which includes various components operable, configured, or adapted to perform the method 1100. Communications device 1400 is described below in further detail.

In one aspect, transmitting the updated MCS offset comprises transmitting the updated MCS offset to the UE via a media access control-control element (MAC-CE) or radio resource control (RRC) signaling.

In one aspect, receiving the UL channel transmission associated with the one or more LCs comprises receiving a plurality of transport block (TBs) in the UL channel transmission.

In one aspect, each TB of the plurality of TBs is associated with a different LC of the plurality of LCs and a different MCS from a set of MCSs corresponding to that different LC, and receiving the UL channel transmission associated with the one or more LCs comprises receiving each TB associated with the different LC using the different MCS corresponding to that TB and different LC.

Note that FIG. 11 is just one example of a method, and other methods including fewer, additional, or alternative steps are possible consistent with this disclosure.

Figure 12:
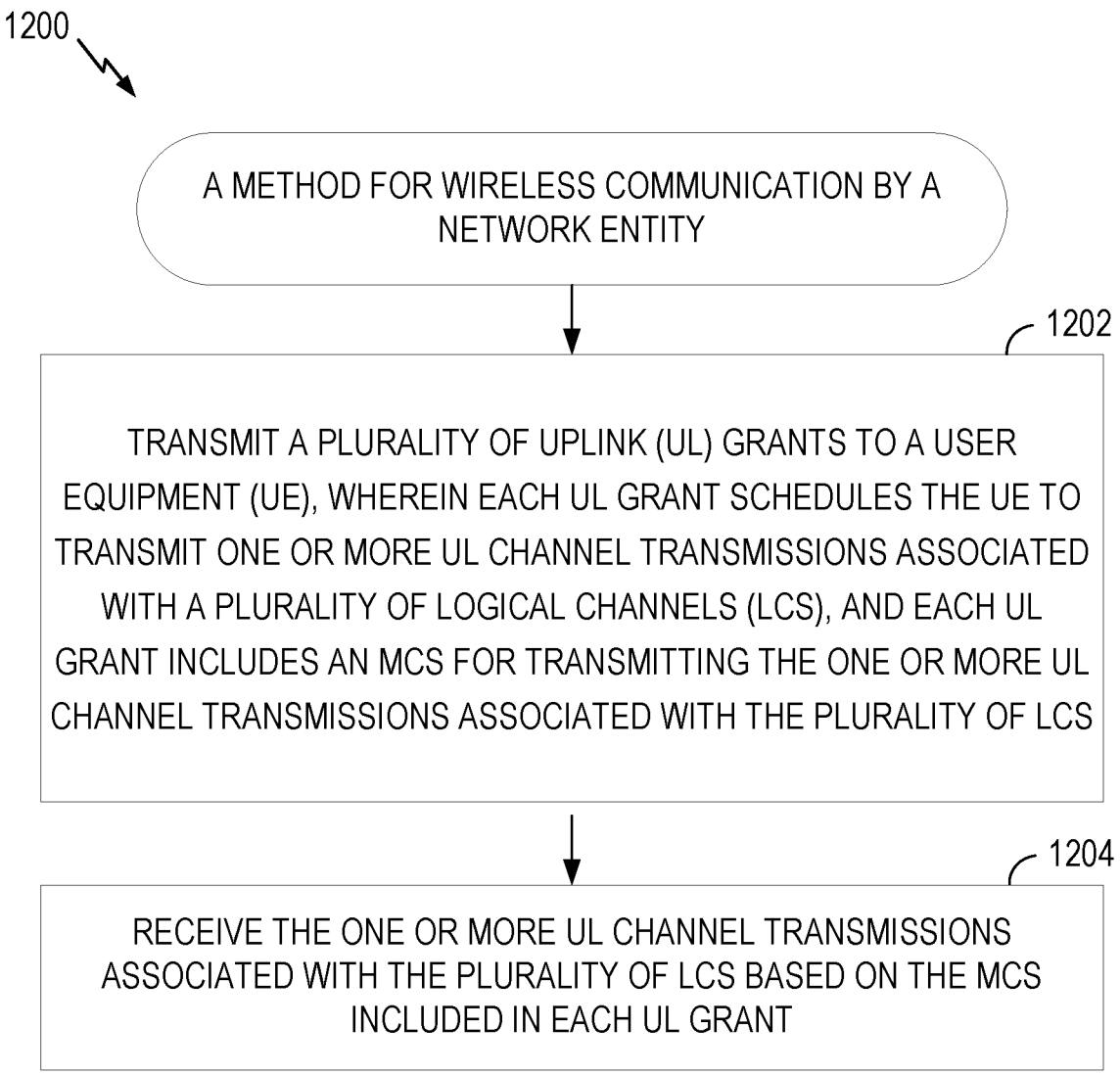
FIG. 12 depicts a method for wireless communication.

FIG. 12 shows a method 1200 for wireless communication by a network entity, such as BS 102 of FIGS. 1 and 3, or a disaggregated base station as discussed with respect to FIG. 2.

Method 1200 begins at 1202 with transmitting a plurality of uplink (UL) grants to a user equipment (UE), wherein: each UL grant schedules the UE to transmit one or more UL channel transmissions associated with a plurality of logical channels (LCs), and each UL grant includes an MCS for transmitting the one or more UL channel transmissions associated with the plurality of LCs.

Method 1200 then proceeds to step 1204 with receiving the one or more UL channel transmissions associated with the plurality of LCs based on the MCS included in each UL grant.

In one aspect, method 1200 further includes transmitting an indication of a BLER target for each LC in the plurality of LCs, wherein the indication of the BLER target for each LC in the plurality of LCs is transmitted in fifth generation quality of service indicator (5QI) signaling.

In one aspect, the plurality of LCs are grouped into different groups of LCs based on a block error rate (BLER) target for each LC in the plurality of LCs, and each group of LCs is associated with a different BLER target and includes LCs of the plurality of LCs associated with that BLER target.

In one aspect, each UL grant of the plurality of UL grants transmitted to the UE corresponds to a different group of LCs.

In one aspect, each UL grant of the plurality of UL grants includes at least one of: a LC group index indicating the different group of LCs to which that UL grant corresponds, or a BLER index indicating the different group of LCs to which that UL grant corresponds, and the plurality of LCs are grouped into the different groups of LCs based on the LC group index or BLER index included in each UL grant.

In one aspect, each UL grant of the plurality of UL grants includes a bitmap of LC identifiers (LCIDs) indicating LCs of the plurality of LCs that correspond with that UL grant, and the plurality of LCs are grouped into the different groups of LCs based on the bitmap of LCIDs included in each UL grant.

In one aspect, each UL grant is transmitted in a different search space, and the different search space of each UL grant indicates the different group of LCs to which that UL grant corresponds, and the plurality of LCs are grouped into the different groups of LCs based on the different search spaces in which the UL grants are received.

In one aspect, the MCS of each UL grant comprises a same MCS, and each UL grant includes a power boosting level for the different group of LCs corresponding to that UL grant.

In one aspect, the MCS of each UL grant comprises a different MCS, and each UL grant includes a power boosting level for the different group of LCs corresponding to that UL grant.

In one aspect, the plurality of UL grants are transmitted in a continuous search space.

In one aspect, the plurality of UL grants are transmitted using a same set of frequency resources at different times.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

Example Communication Devices

FIG. 13 depicts aspects of an example communications device 1300. In some aspects, communications device 1300 is a user equipment, such as UE 104 described above with respect to FIGS. 1 and 3.

The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes one or more processors 1320. In various aspects, the one or more processors 1320 may be representative of one or more of receive processor 358, transmit processor 364, TX MIMO processor 366, and/or controller/processor 380, as described with respect to FIG. 3. The one or more processors 1320 are coupled to a computer-readable medium/memory 1330 via a bus 1306. In certain aspects, the computer-readable medium/memory 1330 is configured to store instructions (e.g., computer-executable code) that when executed by the one or more processors 1320, cause the one or more processors 1320 to perform the methods 900 and 1000 described with respect to FIGS. 9 and 10, or any aspect related to it. Note that reference to a processor performing a function of communications device 1300 may include one or more processors performing that function of communications device 1300.

In the depicted example, computer-readable medium/memory 1330 stores code 1331 (e.g., executable instructions) for receiving, code 1332 for transmitting, code 1333 for determining, code 1334 for obtaining, and code 1335 for grouping. Processing of the code 1331-1335 may cause the communications device 1300 to perform the methods 900 and 1000 described with respect to FIGS. 9 and 10, or any aspect related to it.

The one or more processors 1320 include circuitry configured to implement (e.g., execute) the code stored in the computer-readable medium/memory 1330, including circuitry 1321 for receiving, circuitry 1322 for transmitting, circuitry 1323 for determining, code 1334 for obtaining, and code 1335 for grouping. Processing with circuitry 1321-1323 may cause the communications device 1300 to perform the methods 900 and 1000 described with respect to FIGS. 9 and 10, or any aspect related to it.

Various components of the communications device 1300 may provide means for performing the methods 900 and 1000 described with respect to FIGS. 9 and 10, or any aspect related to it. For example, means for transmitting, sending or outputting for transmission may include the transceivers 354 and/or antenna(s) 352 of the UE 104 illustrated in FIG. 3 and/or transceiver 1308 and antenna 1310 of the communications device 1300 in FIG. 13. Means for receiving or obtaining may include the transceivers 354 and/or antenna(s) 352 of the UE 104 illustrated in FIG. 3 and/or transceiver 1308 and antenna 1310 of the communications device 1300 in FIG. 13.

FIG. 14 depicts aspects of an example communications device.

The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes one or more processors 1420. In various aspects, one or more processors 1420 may be representative of one or more of receive processor 338, transmit processor 320, TX MIMO processor 330, and/or controller/processor 340, as described with respect to FIG. 3. The one or more processors 1420 are coupled to a computer-readable medium/memory 1430 via a bus 1406. In certain aspects, the computer-readable medium/memory 1430 is configured to store instructions (e.g., computer-executable code) that when executed by the one or more processors 1420, cause the one or more processors 1420 to perform the methods 1100 and 1200 described with respect to FIGS. 11 and 12, or any aspect related to it. Note that reference to a processor of communications device 1400 performing a function may include one or more processors of communications device 1400 performing that function.

In the depicted example, the computer-readable medium/memory 1430 stores code 1431 (e.g., executable instructions) for transmitting, code 1432 for receiving, and code 1433 for indicating. Processing of the code 1431-1433 may cause the communications device 1400 to perform the methods 1100 and 1200 described with respect to FIGS. 11 and 12, or any aspect related to it.

The one or more processors 1420 include circuitry configured to implement (e.g., execute) the code stored in the computer-readable medium/memory 1430, including circuitry 1421 for transmitting, circuitry 1422 for receiving, and circuitry 1423 for indicating. Processing with circuitry 1421-1423 may cause the communications device 1400 to perform the methods 1100 and 1200 as described with respect to FIGS. 11 and 12, or any aspect related to it.

Various components of the communications device 1400 may provide means for performing the methods 1100 and 1200 as described with respect to FIGS. 11 and 12, or any aspect related to it. Means for transmitting, sending or outputting for transmission may include the transceivers 332 and/or antenna(s) 334 of the BS 102 illustrated in FIG. 3 and/or transceiver 1408 and antenna 1410 of the communications device 1400 in FIG. 14. Means for receiving or obtaining may include the transceivers 332 and/or antenna(s) 334 of the BS 102 illustrated in FIG. 3 and/or transceiver 1408 and antenna 1410 of the communications device 1400 in FIG. 14.

Example Clauses

Implementation examples are described in the following numbered clauses:

Clause 1: A method for wireless communication by a user equipment (UE), comprising receiving an uplink (UL) grant from a network entity, wherein the UL grant schedules the UE to transmit an UL channel transmission associated with a plurality of logical channels (LCs), and the UL grant indicates a modulation and coding scheme (MCS) for transmitting the UL channel transmission associated with the plurality of LCs, receiving a plurality of MCS offsets, and transmitting the UL channel transmission associated with one or more LCs of the plurality of LCs based on the MCS indicated in the UL grant and the plurality of MCS offsets.

Clause 2: The method of clause 1, wherein the plurality of MCS offsets includes MCS offsets corresponding to different types of LCs of the plurality of LCs.

Clause 3: The method of clause 2, wherein the different types of LCs include at least a first type of LC corresponding to LCs of the plurality of LCs associated with a first block error rate (BLER) target level, and a second type of LC corresponding to LCs of the plurality of LCs associated with a second BLER target level, and the first BLER target level is higher than the second BLER target level.

Clause 4: The method of any one of clauses 2 through 3, further comprising determining a set of MCSs, the set of MCSs including a different MCS for each different type of LC of the different types of LCs.

Clause 5: The method of clause 4, wherein determining the set of MCSs comprises, for each different type of LC, applying a corresponding MCS offset for that different type of LC to the MCS indicated in the UL grant.

Clause 6: The method of any one of clauses 4 through 5, wherein transmitting the UL channel transmission associated with the one or more LCs comprises transmitting one transport block (TB) in the UL channel transmission.

Clause 7: The method of clause 6, wherein receiving the UL channel transmission associated with the one or more LCs comprises receiving the one TB using an MCS corresponding to an LC with UL traffic in the one TB with a highest priority.

Clause 8: The method of any one of clauses 6 through 7, wherein transmitting the UL channel transmission associated with the one or more LCs comprises transmitting the one TB using a lowest MCS from the set of MCSs corresponding to an LC having UL traffic for transmission.

Clause 9: The method of any one of clauses 6 through 8, wherein the set of MCSs include at least one MCS that is lower than the MCS indicated in the UL grant resulting from application of a negative offset from the plurality of MCS offsets being applied to the MCS indicated in the UL grant, and transmitting the UL channel transmission associated with the one or more LCs comprises transmitting the one TB using the at least one MCS that is lower than the MCS indicated in the UL grant only when a second set of LCs associated with one or more higher MCSs do not have UL traffic for transmission.

Clause 10: The method of any one of clauses 6 through 9, further comprising receiving an updated MCS offset for a first LC of the plurality of LCs having first UL traffic for transmission, wherein the updated MCS offset is based on a packet delay budget (PDB) associated with the first UL traffic for transmission for the first LC, and determining an updated MCS for the first LC by applying the updated MCS offset to the MCS indicated in the UL grant, wherein transmitting the UL channel transmission associated with the one or more LCs comprises transmitting the first UL traffic in the one TB using the updated MCS.

Clause 11: The method of clause 10, wherein receiving the updated MCS offset comprises receiving the updated MCS offset from the network entity via a media access control-control element (MAC-CE) or radio resource control (RRC) signaling.

Clause 12: The method of any one of clauses 4 through 10, wherein transmitting the UL channel transmission associated with the one or more LCs comprises transmitting a plurality of transport block (TBs) in the UL channel transmission.

Clause 13: The method of clause 12, wherein each TB of the plurality of TBs is associated with a different LC of the plurality of LCs and a different MCS from the set of MCSs corresponding to that different LC, and transmitting the UL channel transmission associated with the one or more LCs comprises transmitting each TB associated with the different LC using the different MCS corresponding to that TB and different LC.

Clause 14: The method of clause 13, further comprising transmitting uplink control information (UCI) with the UL channel transmission associated with the plurality of logical channels.

Clause 15: The method of clause 14, wherein, for each TB of the plurality of TBs transmitted in the UL channel transmission, the UCI indicates at least one of a starting position in frequency for that TB, a starting position in time for that TB, a bandwidth of that TB, or a length of that TB in time.

Clause 16: The method of any one of clauses 14 through 15, wherein transmitting the UCI comprises one of transmitting the UCI in a long physical uplink control channel multiplexed with the UL channel transmission, transmitting the UCI in a short physical uplink control channel multiplexed with the UL channel transmission, or transmitting the UCI in the UL channel transmission.

Clause 17: The method of any one of clauses 14 through 16, wherein transmitting the UCI comprises transmitting the UCI using the MCS indicated in the UL grant.

Clause 18: The method of any one of clauses 13 through 17, wherein the UL grant is received in downlink control information (DCI), the DCI including separate LC-specific parameters for each TB of the plurality of TBs.

Clause 19: The method of clause 18, wherein the separate LC-specific parameters include at least different hybrid automatic repeat request (HARQ) process IDs for each TB of the plurality of TBs.

Clause 20: The method of clause 19, further comprising receiving one or more updated LC-specific parameters for at least one TB of the plurality of TBs in a media access control-control element (MAC-CE) or radio resource control (RRC) signaling from the BS.

Clause 21: The method of any one of clauses 19 through 20, further comprising receiving an additional DCI from the network entity including an indication of one of the HARQ process IDs corresponding to one of the TBs of the plurality of TBs, the indication of the one HARQ process ID indicating to the UE to retransmit the one TB corresponding to the one HARQ process ID.

Clause 22: A method for wireless communication by a user equipment (UE), comprising: receiving a plurality of uplink (UL) grants from a network entity, wherein: each UL grant schedules the UE to transmit one or more UL channel transmissions associated with a plurality of logical channels (LCs), and each UL grant includes an MCS for transmitting the one or more UL channel transmissions associated with the plurality of LCs; and transmitting the one or more UL channel transmissions associated with the plurality of LCs based on the MCS included in each UL grant.

Clause 23: The method of clause 22, further comprising grouping the plurality of LCs into different groups of LCs.

Clause 24: The method of clause 23, wherein: grouping the plurality of LCs into the different groups of LCs is based on a block error rate (BLER) target for each LC in the plurality of LCs, and each group of LCs is associated with a different BLER target and includes LCs of the plurality of LCs associated with that BLER target.

Clause 25: The method of clause 24, further comprising obtaining an indication of the BLER target for each LC in the plurality of LCs, wherein the indication of the BLER target for each LC in the plurality of LCs is one of obtained directly in fifth generation quality of service indicator (5QI) signaling received from the BS, or obtained based on packet delay budgets (PDBs) for each LC and a 5QI table.

Clause 26: The method of any one of clauses 23 through 25, wherein each UL grant of the plurality of UL grants received from the network entity corresponds to a different group of LCs.

Clause 27: The method of clause 26, wherein each UL grant of the plurality of UL grants includes at least one of a LC group index indicating the different group of LCs to which that UL grant corresponds, or a BLER index indicating the different group of LCs to which that UL grant corresponds, and grouping the plurality of LCs into the different groups of LCs is based on the LC group index or BLER index included in each UL grant.

Clause 28: The method of any one of clauses 26 through 27, wherein: each UL grant of the plurality of UL grants includes a bitmap of LC identifiers (LCIDs) indicating LCs of the plurality of LCs that correspond with that UL grant, and grouping the plurality of LCs into the different groups of LCs is based on the bitmap of LCIDs included in each UL grant.

Clause 29: The method of any one of clauses 26 through 28, wherein: each UL grant is received in a different search space, and the different search space of each UL grant indicates the different group of LCs to which that UL grant corresponds, and grouping the plurality of LCs into the different groups of LCs is based on the different search spaces in which the UL grants are received.

Clause 30: The method of any one of clauses 26 through 29, wherein the MCS of each UL grant comprises a same MCS, and each UL grant includes a power boosting level for the different group of LCs corresponding to that UL grant.

Clause 31: The method of any one of clauses 26 through 30, wherein the MCS of each UL grant comprises a different MCS, and each UL grant includes a power boosting level for the different group of LCs corresponding to that UL grant.

Clause 32: The method of any one of clauses 22 through 31, wherein the plurality of UL grants are received in a continuous search space.

Clause 33: The method of any one of clauses 22 through 31, wherein the plurality of UL grants are received using a same set of frequency resources at different times.

Clause 34: A method for wireless communication by a network entity, comprising transmitting an uplink (UL) grant to a user equipment (UE), wherein: the UL grant schedules the UE to transmit an UL channel transmission associated with a plurality of logical channels (LCs), and the UL grant indicates a modulation and coding scheme (MCS) for transmitting the UL channel transmission associated with the plurality of LCs, transmitting a plurality of MCS offsets to the UE, and receiving the UL channel transmission associated with one or more LCs of the plurality of LCs based on the MCS indicated in the UL grant and the plurality of MCS offsets.

Clause 35: The method of clause 34, wherein the plurality of MCS offsets includes MCS offsets corresponding to different types of LCs of the plurality of LCs.

Clause 36: The method of clause 35, wherein the different types of LCs include at least a first type of LC corresponding to LCs of the plurality of LCs associated with a first block error rate (BLER) target level, and a second type of LC corresponding to LCs of the plurality of LCs associated with a second BLER target level, and the first BLER target level is higher than the second BLER target level.

Clause 37: The method of any one of clauses 34 through 36, wherein receiving the UL channel transmission associated with the one or more LCs comprises receiving one transport block (TB) in the UL channel transmission.

Clause 38: The method of clause 37, wherein receiving the UL channel transmission associated with the one or more LCs comprises receiving the one TB using an MCS corresponding to an LC with UL traffic in the one TB having a highest priority.

Clause 39: The method of any one of clauses 37 through 38, wherein receiving the UL channel transmission associated with the one or more LCs comprises receiving the one TB using a lowest MCS corresponding to an LC having UL traffic in the one TB.

Clause 40: The method of any one of clauses 37 through 39, wherein receiving the UL channel transmission associated with the one or more LCs comprises receiving the one TB using at least one MCS that is lower than the MCS indicated in the UL grant.

Clause 41: The method of any one of clauses 37 through 40, further comprising: transmitting an updated MCS offset for a first LC of the plurality of LCs having first UL traffic for transmission, wherein the updated MCS offset is based on a packet delay budget (PDB) associated with the first UL traffic for transmission for the first LC, wherein receiving the UL channel transmission associated with the one or more LCs comprises receiving the first UL traffic in the one TB using the updated MCS.

Clause 42: The method of clause 41, wherein transmitting the updated MCS offset comprises transmitting the updated MCS offset to the UE via a media access control-control element (MAC-CE) or radio resource control (RRC) signaling.

Clause 43: The method of any one of clauses 34 through 42, wherein receiving the UL channel transmission associated with the one or more LCs comprises receiving a plurality of transport block (TBs) in the UL channel transmission.

Clause 44: The method of clause 43, wherein each TB of the plurality of TBs is associated with a different LC of the plurality of LCs and a different MCS from a set of MCSs corresponding to that different LC, and receiving the UL channel transmission associated with the one or more LCs comprises receiving each TB associated with the different LC using the different MCS corresponding to that TB and different LC.

Clause 45: The method of clause 44, further comprising receiving uplink control information (UCI) with the UL channel transmission associated with the plurality of logical channels.

Clause 46: The method of clause 45, wherein, for each TB of the plurality of TBs transmitted in the UL channel transmission, the UCI indicates at least one of: a starting position in frequency for that TB, a starting position in time for that TB, a bandwidth of that TB, or a length of that TB in time.

Clause 47: The method of any one of clauses 45 through 46, wherein receiving the UCI comprises one of: receiving the UCI in a long physical uplink control channel multiplexed with the UL channel transmission, receiving the UCI in a short physical uplink control channel multiplexed with the UL channel transmission, or receiving the UCI in the UL channel transmission.

Clause 48: The method of any one of clauses 45 through 47, wherein receiving the UCI comprises receiving the UCI using the MCS indicated in the UL grant.

Clause 49: The method of any one of clauses 44 through 48, wherein the UL grant is transmitted in downlink control information (DCI), the DCI including separate LC-specific parameters for each TB of the plurality of TBs.

Clause 50: The method of clause 49, wherein the separate LC-specific parameters include at least different hybrid automatic repeat request (HARQ) process IDs for each TB of the plurality of TBs.

Clause 51: The method of clause 50, further comprising transmitting one or more updated LC-specific parameters for at least one TB of the plurality of TBs in a media access control-control element (MAC-CE) or radio resource control (RRC) signaling from the network entity.

Clause 52: The method of any one of clauses 50 through 51, further comprising transmitting an additional DCI from the network entity including an indication of one of the HARQ process IDs corresponding to one of the TBs of the plurality of TBs, the indication of the one HARQ process ID indicating to the UE to retransmit the one TB corresponding to the one HARQ process ID.

Clause 53: A method for wireless communication by a network entity, comprising transmitting a plurality of uplink (UL) grants to a user equipment (UE), wherein: each UL grant schedules the UE to transmit one or more UL channel transmissions associated with a plurality of logical channels (LCs), and each UL grant includes an MCS for transmitting the one or more UL channel transmissions associated with the plurality of LCs; and receiving the one or more UL channel transmissions associated with the plurality of LCs based on the MCS included in each UL grant.

Clause 54: The method of clause 53, wherein the plurality of LCs are grouped into different groups of LCs based on a block error rate (BLER) target for each LC in the plurality of LCs, and each group of LCs is associated with a different BLER target and includes LCs of the plurality of LCs associated with that BLER target.

Clause 55: The method of any one of clauses 53 through 54, further comprising transmitting an indication of a BLER target for each LC in the plurality of LCs, wherein the indication of the BLER target for each LC in the plurality of LCs is transmitted in fifth generation quality of service indicator (5QI) signaling.

Clause 56. The method of any one of clauses 54 through 55, wherein each UL grant of the plurality of UL grants transmitted to the UE corresponds to a different group of LCs.

Clause 57: The method of clause 56, wherein each UL grant of the plurality of UL grants includes at least one of: a LC group index indicating the different group of LCs to which that UL grant corresponds, or a BLER index indicating the different group of LCs to which that UL grant corresponds, and the plurality of LCs are grouped into the different groups of LCs based on the LC group index or BLER index included in each UL grant.

Clause 58: The method of any one of clauses 56 through 57, wherein each UL grant of the plurality of UL grants includes a bitmap of LC identifiers (LCIDs) indicating LCs of the plurality of LCs that correspond with that UL grant, and the plurality of LCs are grouped into the different groups of LCs based on the bitmap of LCIDs included in each UL grant.

Clause 59: The method of any one of clauses 56 through 58, wherein each UL grant is transmitted in a different search space, and the different search space of each UL grant indicates the different group of LCs to which that UL grant corresponds, and the plurality of LCs are grouped into the different groups of LCs based on the different search spaces in which the UL grants are received.

Clause 60: The method of any one of clauses 56 through 59, wherein the MCS of each UL grant comprises a same MCS, and each UL grant includes a power boosting level for the different group of LCs corresponding to that UL grant.

Clause 61: The method of any one of clauses 56 through 60, wherein the MCS of each UL grant comprises a different MCS, and each UL grant includes a power boosting level for the different group of LCs corresponding to that UL grant.

Clause 62: The method of any one of clauses 53 through 61, wherein the plurality of UL grants are transmitted in a continuous search space.

Clause 63: The method of any one of clauses 53 through 62, wherein the plurality of UL grants are transmitted using a same set of frequency resources at different times.

Clause 64: An apparatus, comprising: a memory comprising executable instructions; and a processor configured to execute the executable instructions and cause the apparatus to perform a method in accordance with any one of Clauses 1-63.

Clause 65: An apparatus, comprising means for performing a method in accordance with any one of Clauses 1-63.

Clause 66: A non-transitory computer-readable medium comprising executable instructions that, when executed by a processor of an apparatus, cause the apparatus to perform a method in accordance with any one of Clauses 1-63.

Clause 67: A computer program product embodied on a computer-readable storage medium comprising code for performing a method in accordance with any one of Clauses 1-63.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), comprising:
   receiving an uplink (UL) grant from a network entity, wherein:
      the UL grant schedules the UE to transmit an UL channel transmission associated with a plurality of logical channels (LCs), and the UL grant indicates a modulation and coding scheme (MCS) for transmitting the UL channel transmission associated with the plurality of LCs;

receiving a plurality of MCS offsets; and transmitting the UL channel transmission associated with one or more LCs of the plurality of LCs based on the MCS indicated in the UL grant and the plurality of MCS offsets.

2. The method of claim 1, wherein the plurality of MCS offsets includes MCS offsets corresponding to different types of LCs of the plurality of LCs.

3. The method of claim 2, wherein:

the different types of LCs include at least:

a first type of LC corresponding to LCs of the plurality of LCs associated with a first block error rate (BLER) target level, and a second type of LC corresponding to LCs of the plurality of LCs associated with a second BLER target level, and the first BLER target level is higher than the second BLER target level.

4. The method of claim 2, further comprising determining a set of MCSs, the set of MCSs including a different MCS for each different type of LC of the different types of LCs.

5. The method of claim 4, wherein determining the set of MCSs comprises, for each different type of LC, applying a corresponding MCS offset for that different type of LC to the MCS indicated in the UL grant.

6. The method of claim 4, wherein transmitting the UL channel transmission associated with the one or more LCs comprises transmitting one transport block (TB) in the UL channel transmission.

7. The method of claim 6, wherein receiving the UL channel transmission associated with the one or more LCs comprises receiving the one TB using an MCS corresponding to an LC with UL traffic in the one TB with a highest priority.

8. The method of claim 6, wherein transmitting the UL channel transmission associated with the one or more LCs comprises transmitting the one TB using a lowest MCS from the set of MCSs corresponding to an LC having UL traffic for transmission.

9. The method of claim 6, wherein:

the set of MCSs include at least one MCS that is lower than the MCS indicated in the UL grant resulting from application of a negative offset from the plurality of MCS offsets being applied to the MCS indicated in the UL grant, and transmitting the UL channel transmission associated with the one or more LCs comprises transmitting the one TB using the at least one MCS that is lower than the MCS indicated in the UL grant only when a second set of LCs associated with one or more higher MCSs do not have UL traffic for transmission.

10. The method of claim 6, further comprising:

receiving an updated MCS offset for a first LC of the plurality of LCs having first UL traffic for transmission, wherein the updated MCS offset is based on a packet delay budget (PDB) associated with the first UL traffic for transmission for the first LC, wherein receiving the updated MCS offset comprises receiving the updated MCS offset from the network entity via a media access control-control element (MAC-CE) or radio resource control (RRC) signaling; and determining an updated MCS for the first LC by applying the updated MCS offset to the MCS indicated in the UL grant, wherein transmitting the UL channel transmission associated with the one or more LCs comprises transmitting the first UL traffic in the one TB using the updated MCS.

11. The method of claim 4, wherein transmitting the UL channel transmission associated with the one or more LCs comprises transmitting a plurality of transport block (TBs) in the UL channel transmission.

12. The method of claim 11, wherein:

each TB of the plurality of TBs is associated with a different LC of the plurality of LCs and a different MCS from the set of MCSs corresponding to that different LC, and transmitting the UL channel transmission associated with the one or more LCs comprises transmitting each TB associated with the different LC using the different MCS corresponding to that TB and different LC.

13. The method of claim 12, further comprising transmitting uplink control information (UCI) with the UL channel transmission associated with the plurality of logical channels.

14. The method of claim 13, wherein, for each TB of the plurality of TBs transmitted in the UL channel transmission, the UCI indicates at least one of:

a starting position in frequency for that TB, a starting position in time for that TB, a bandwidth of that TB, or a length of that TB in time.

15. The method of claim 13, wherein transmitting the UCI comprises one of:

transmitting the UCI in a long physical uplink control channel multiplexed with the UL channel transmission, transmitting the UCI in a short physical uplink control channel multiplexed with the UL channel transmission, or transmitting the UCI in the UL channel transmission.

16. The method of claim 13, wherein transmitting the UCI comprises transmitting the UCI using the MCS indicated in the UL grant.

17. The method of claim 12, wherein the UL grant is received in downlink control information (DCI), the DCI including separate LC-specific parameters for each TB of the plurality of TBs, and the separate LC-specific parameters include at least different hybrid automatic repeat request (HARQ) process IDs for each TB of the plurality of TBs, further comprising:

receiving one or more updated LC-specific parameters for at least one TB of the plurality of TBs in a media access control-control element (MAC-CE) or radio resource control (RRC) signaling from the BS; and receiving an additional DCI from the network entity including an indication of one of the HARQ process IDs corresponding to one of the TBs of the plurality of TBs, the indication of the one HARQ process ID indicating to the UE to retransmit the one TB corresponding to the one HARQ process ID.

18. A method for wireless communication by a user equipment (UE), comprising:

receiving a plurality of uplink (UL) grants from a network entity, wherein:

each UL grant schedules the UE to transmit one or more UL channel transmissions associated with a plurality of logical channels (LCs), and each UL grant includes an MCS for transmitting the one or more UL channel transmissions associated with the plurality of LCs; and transmitting the one or more UL channel transmissions associated with the plurality of LCs based on the MCS included in each UL grant.

19. The method of claim 18, further comprising grouping the plurality of LCs into different groups of LCs, wherein:
grouping the plurality of LCs into the different groups of LCs is based on a block error rate (BLER) target for each LC in the plurality of LCs, and
each group of LCs is associated with a different BLER target and includes LCs of the plurality of LCs associated with that BLER target.

20. The method of claim 19, further comprising obtaining an indication of the BLER target for each LC in the plurality of LCs, wherein the indication of the BLER target for each LC in the plurality of LCs is one of:
obtained directly in fifth generation quality of service indicator (5QI) signaling received from the BS, or
obtained based on packet delay budgets (PDBs) for each LC and a 5QI table.

21. The method of claim 19, wherein each UL grant of the plurality of UL grants received from the network entity corresponds to a different group of LCs.

22. The method of claim 21, wherein:
each UL grant of the plurality of UL grants includes at least one of:
a LC group index indicating the different group of LCs to which that UL grant corresponds, or
a BLER index indicating the different group of LCs to which that UL grant corresponds, and
grouping the plurality of LCs into the different groups of LCs is based on the LC group index or BLER index included in each UL grant.

23. The method of claim 21, wherein:
each UL grant of the plurality of UL grants includes a bitmap of LC identifiers (LCIDs) indicating LCs of the plurality of LCs that correspond with that UL grant, and
grouping the plurality of LCs into the different groups of LCs is based on the bitmap of LCIDs included in each UL grant.

24. The method of claim 21, wherein:
each UL grant is received in a different search space, and
a different search space of each UL grant indicates the different group of LCs to which that UL grant corresponds, and
grouping the plurality of LCs into the different groups of LCs is based on the different search spaces in which the UL grants are received.

25. The method of claim 21, wherein:
the MCS of each UL grant comprises a same MCS, and
each UL grant includes a power boosting level for the different group of LCs corresponding to that UL grant.

26. The method of claim 21, wherein:
the MCS of each UL grant comprises a different MCS, and
each UL grant includes a power boosting level for the different group of LCs corresponding to that UL grant.

27. The method of claim 18, wherein the plurality of UL grants are received in a continuous search space.

28. The method of claim 18, wherein the plurality of UL grants are received using a same set of frequency resources at different times.

29. A user equipment (UE) configured for wireless communication, comprising:
a memory comprising computer-executable instructions; and
a processor configured to execute the computer-executable instructions and cause the UE to:
receive a plurality of uplink (UL) grants from a network entity, wherein:
each UL grant schedules the UE to transmit one or more UL channel transmissions associated with a plurality of logical channels (LCs), and
each UL grant includes an MCS for transmitting the one or more UL channel transmissions associated with the plurality of LCs; and
transmit the one or more UL channel transmissions associated with the plurality of LCs based on the MCS included in each UL grant.

30. A user equipment (UE) configured for wireless communication, comprising:
a memory comprising computer-executable instructions; and
a processor configured to execute the computer-executable instructions and cause the UE to:
receive an uplink (UL) grant from a network entity, wherein:
the UL grant schedules the UE to transmit an UL channel transmission associated with a plurality of logical channels (LCs), and
the UL grant indicates a modulation and coding scheme (MCS) for transmitting the UL channel transmission associated with the plurality of LCs;
receive a plurality of MCS offsets; and
transmit the UL channel transmission associated with one or more LCs of the plurality of LCs based on the MCS indicated in the UL grant and the plurality of MCS offsets.

* * * * *